US009189577B2

(12) United States Patent
Kuboi et al.

(10) Patent No.: US 9,189,577 B2
(45) Date of Patent: Nov. 17, 2015

(54) SIMULATION METHOD, SIMULATION PROGRAM, PROCESSING UNIT, AND SIMULATOR

(71) Applicant: Sony Corporation, Tokyo (JP)

(72) Inventors: Nobuyuki Kuboi, Kanagawa (JP); Takashi Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 327 days.

(21) Appl. No.: 13/919,470

(22) Filed: Jun. 17, 2013

(65) Prior Publication Data
US 2014/0005990 A1 Jan. 2, 2014

(30) Foreign Application Priority Data

Jun. 28, 2012 (JP) ................. 2012-146065
Jan. 29, 2013 (JP) ................. 2013-014556

(51) Int. Cl.
*G06F 17/50* (2006.01)
(52) U.S. Cl.
CPC ........ *G06F 17/5009* (2013.01); *G06F 2217/16* (2013.01)
(58) Field of Classification Search
USPC ............... 703/2, 6, 9; 345/426; 362/235
See application file for complete search history.

(56) References Cited

U.S. PATENT DOCUMENTS

| 6,313,842 | B1 * | 11/2001 | Tampieri ................ 345/426 |
| 7,375,490 | B2 * | 5/2008 | Furem ................ 318/801 |
| 7,850,338 | B1 * | 12/2010 | Messina et al. ............. 362/235 |
| 8,891,168 | B2 * | 11/2014 | Minemura et al. ....... 359/485.05 |
| 2008/0259243 | A1 * | 10/2008 | Ohta et al. ................ 349/64 |
| 2015/0161816 | A1 * | 6/2015 | Grenfell ................ 703/2 |

FOREIGN PATENT DOCUMENTS

JP 2687270 8/1997
JP 3188926 5/2001

OTHER PUBLICATIONS

Tazawa, et al., "A High-Speed 2-D Topography Simulator Based on a Pixel Model", IEEE Transaction on Computer-Aided Design of integrated Circuits and Systems, vol. 16, No. 4, Apr. 1997, pp. 386-397.

* cited by examiner

*Primary Examiner* — Thai Phan
(74) *Attorney, Agent, or Firm* — Dentons US LLP

(57) ABSTRACT

A simulation method allowing an information processing unit to perform calculation, the calculation includes: decomposing each of a plurality of incident fluxes into flux components in respective unit vector directions that are orthogonal to each other, the plurality of incident fluxes entering, at an arbitrary position, a surface of a processing target that is a target of a predetermined processing; summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

20 Claims, 30 Drawing Sheets

SIMULATION METHOD, SIMULATION PROGRAM, PROCESSING UNIT, AND SIMULATOR

BACKGROUND

The present disclosure relates to a simulation method for predicting a processing state of a processing target, to a simulation program, and to a processing unit and a simulator that utilize the simulation method.

As a predicting technique for semiconductor processing, there is processing shape (etching or deposition) simulation. Two models are known as broad categories of this simulation, that is, a string model and a voxel model. The string model is a model based on a flux method. In the string model, a plurality of lattice points are arranged on a surface of a shape, and a surface reaction is solved numerically at each of the lattice points to derive a reaction rate (an etching rate or a deposition rate). Further, a coordinate of the lattice point is moved in a direction of a normal by an amount of the reaction rate, and the lattice points are connected by a string. The string model is a model that expresses processing shape development in such a manner. The normal to the surface that is necessary upon the processing shape development is derived from position information of the adjacent lattice points. Therefore, a deriving method thereof is simple, but on the other hand, followability with respect to steep variation in shape is not favorable due to the features of the deriving method (strings cross one another).

On the other hand, in the voxel model, a shape is expressed by determining whether or not the arranged voxels exist. Therefore, reproducibility of a complicated shape such as a micro-trench is better than that in the string model. Generally, since the voxel model is a calculation technique that uses Monte Carlo method, it is easy to simulate gas transport such as ion and radical transport in a pattern, and micro physical phenomenon and chemical reaction on the surface. However, there are some fundamental issues since the voxel model is a calculation technique that uses the Monte Carlo method. For example, there may be the following issues in the voxel model: calculation load is large; calculation precision and calculation load are in a relationship of trade-off; and a method of deriving a normal with the use of the position information of a voxel from a region having asperities on the surface is difficult since the shape is expressed with the use of voxels.

As an improved version of these calculation techniques, a voxel model based on the flux method (TIGER: Topography Image GEneration Routine) has been proposed (see Japanese patents No. 3188926 and No. 2687270 and "IEEE Transactions on Computer-aided Design of Integrated Circuits and Systems. Vol. 16, No. 4, 1997"). This calculation technique calculates gas transport and surface reaction based on the flux method and is an approximate technique that does not derive a normal to the processed surface. Therefore, this technique calculates faster than the voxel model based on the Monte Carlo method. Further, a reaction rate (an etching rate or a deposition rate) is calculated from a simple surface reaction called a unified model with the use of a gas flux that perpendicularly enters each face of voxels, and thereby, the shape is expressed. At this time, an oval sphere defined by the reaction rate is given, and the voxels in the oval sphere region are removed (etched) or added (deposited). Therefore, this technique achieves more stable shape reproduction that has a smoother surface compared to the simple voxel model.

SUMMARY

However, even in the calculation technique with the use of the voxel model based on the flux method, there may be an issue that calculation precision becomes worse and calculation load becomes larger in some calculation states, for example, when calculation of a deep shape is performed. Moreover, in the existing voxel model, a voxel only has existence information that is information on whether or not a voxel is present, and there is no concept of damage (such as a crystal defect in a processed film) in the voxel itself. Therefore, a range in which the existing voxel model can be applied to electric characteristic evaluation for a CMOS (Complementary Metal Oxide Semiconductor) device, an image sensor, etc. is limited.

Currently, as shown in ITRS (International Technology Roadmap for Semiconductors), minitualization of CMOS devices is further progressed and a processing shape scale and a damage distribution scale have become almost the same. Moreover, for example, upon manufacturing a CMOS image sensor, it has been a point how well processing damage is suppressed in processes. Therefore, a new calculation technology capable of quantitatively predicting and controlling not only the shape but also damage distribution that is caused upon processing and that is considered to largely influence device electric characteristics is desired.

It is desirable to provide a simulation method, a simulation program, a processing unit, and a simulator that have favorable calculation precision and are capable of performing processing prediction with small calculation load.

According to an embodiment of the present disclosure, there is provided a simulation method allowing an information processing unit to perform calculation, the calculation including: decomposing each of a plurality of incident fluxes into flux components in respective unit vector directions that are orthogonal to each other, the plurality of incident fluxes entering, at an arbitrary position, a surface of a processing target that is a target of a predetermined processing; summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

According to an embodiment of the present disclosure, there is provided a non-transitory computer-readable medium storing a simulation program that allows an information processing unit to perform calculation, the calculation including: decomposing each of a plurality of incident fluxes into flux components in respective unit vector directions that are orthogonal to each other, the plurality of incident fluxes entering, at an arbitrary position, a surface of a processing target that is a target of a predetermined processing; summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

According to an embodiment of the present disclosure, there is provided a processing unit including: a processing section performing a predetermined processing on a processing target; and a simulator simulating the predetermined processing. The simulator performing calculation including: decomposing each of a plurality of incident fluxes into flux components in respective unit vector directions that are orthogonal to each other, the plurality of incident fluxes entering, at an arbitrary position, a surface of the processing target; summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

According to an embodiment of the present disclosure, there is provided a simulator including a calculation section simulating a predetermined processing on a processing target. The calculation section performing calculation including: decomposing each of a plurality of incident fluxes into flux components in respective unit vector directions that are orthogonal to each other, the plurality of incident fluxes entering, at an arbitrary position, a surface of the processing target; summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

In the simulation method, the simulation program, the processing unit, and the simulator according to the embodiments of the present disclosure, the flux components in the plurality of unit vector directions of the plurality of incident fluxes are summed up for each of the unit vector directions. Further, the plurality of flux components that are orthogonal to one another and are summations in the respective unit vector directions are synthesized as one vector. In such a manner, the normal vector at the arbitrary position on the surface of the processing target is calculated.

According to the simulation method, the simulation program, the processing unit, and the simulator of the embodiments of the present disclosure, since a process of appropriately calculating the normal vector at the arbitrary position on the surface of the processing target is included, processing prediction is performed with favorable calculation precision and small calculation load.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the present disclosure will be described below in detail with reference to the drawings. The description will be given in the following order.
1. First Embodiment
   1-1. First Example of Simulation Method
   1-2. First Calculation Example
   1-3. Second Calculation Example
   1-4. Third Calculation Example
   1-5. Fourth Calculation Example
2. Second Embodiment
   Second Example of Simulation Method (an example of a method using a string model)
3. Third Embodiment
   Configuration Example of Simulation Software (Program)
4. Fourth Embodiment
   First Configuration Example of Processing Unit
5. Fifth Embodiment
   Second Configuration Example of Processing Unit
6. Sixth Embodiment
   6-1. Third Example of Simulation Method (an example of a method of integrating etching amounts)
   6-2. First Calculation Example
   6-3. Second Calculation Example
   6-4. Configuration Example of Simulation Software (Program)
   6-5. First Configuration Example of Processing Unit
   6-6. Second Configuration Example of Processing Unit
7. Seventh Embodiment
   7-1. Fourth Example of Simulation Method (an example of a calculation method in consideration of variations in IEDF and IADE)
   7-2. First Calculation Example
   7-3. Second Calculation Example
   7-4. Configuration Example of Simulation Software (Program)
   7-5. First Configuration Example of Processing Unit
   7-6. Second Configuration Example of Processing Unit
8. Other Embodiments

1. First Embodiment

1-1. First Example of Simulation Method

Figure 1:
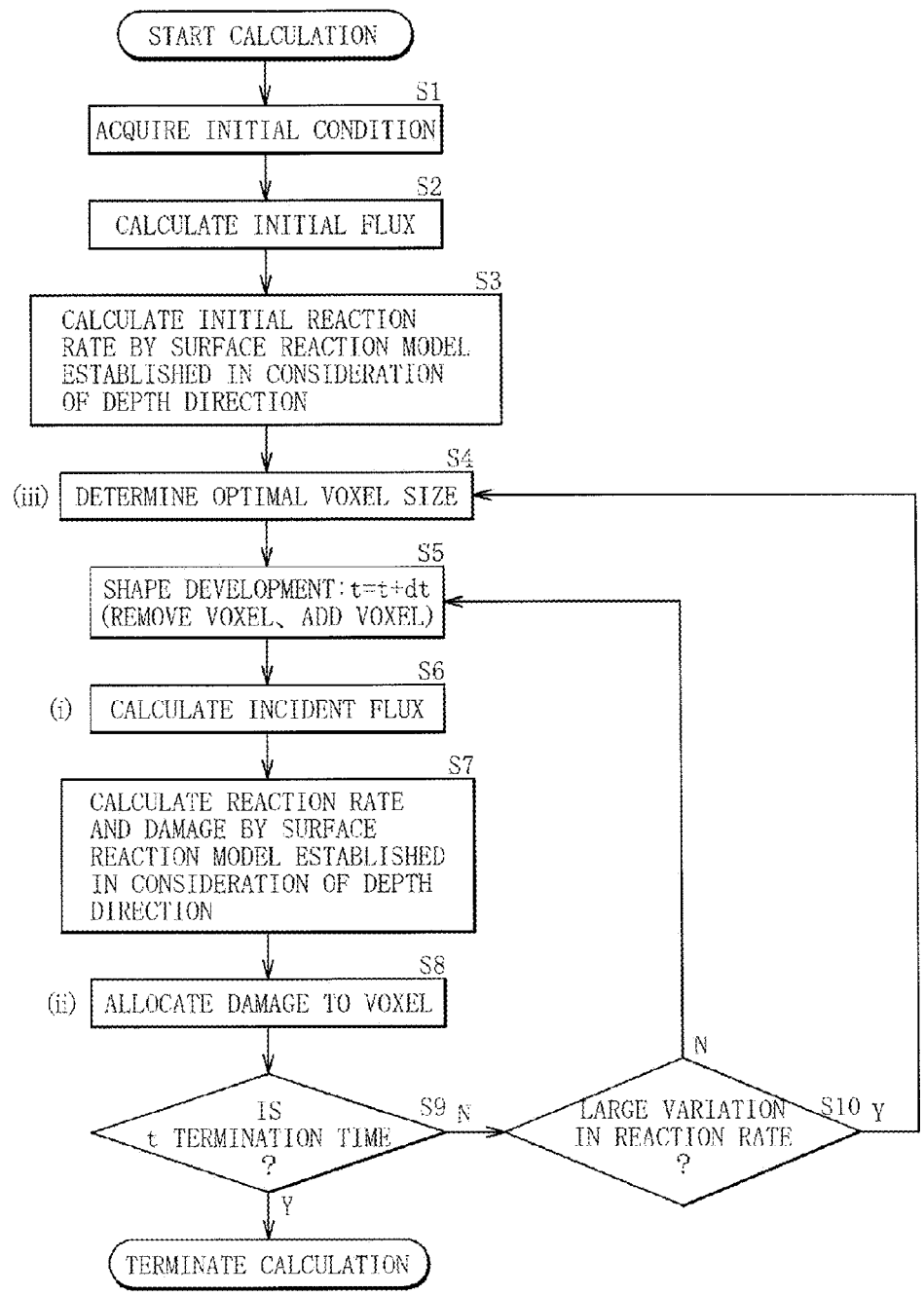
FIG. 1 is a flow chart illustrating an example of a simulation method according to a first embodiment of the present disclosure.
Figure 2:
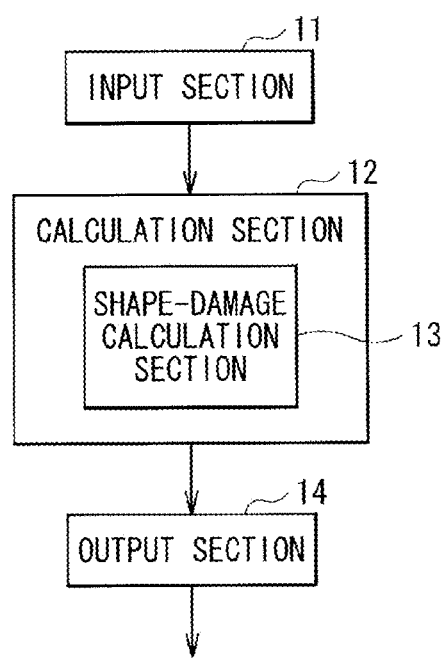
FIG. 2 is a block diagram illustrating a configuration example of a simulator that uses the simulation method according to the first embodiment.

FIG. 1 illustrates an example of a simulation method according to a first embodiment of the present disclosure. FIG. 2 illustrates a configuration example of an information processing unit (simulator) for achieving the simulation method.
[Configuration of Simulator]

The simulator shown in FIG. 2 includes an input section 11, a calculation section 12, and an output section 14. The input section 11 acquires a processing condition for performing a predetermined processing on a processing target which is to be processed and supplies the acquired processing condition to the calculation section 12. The calculation section 12 includes a shape-damage calculation section 13. The shape-damage calculation section 13 may calculate, for example, shape development, damage, etc. of the processing target, based on the processing condition supplied through the input section 11, by the simulation method shown in FIG. 1 which will be described later.

It is to be noted that, in the present embodiment, the shape-damage calculation section 13 may be configured of hardware to achieve a calculation process which will be described later. However, a predetermined simulation program (software) may be used to execute the calculation process. In this case, the shape-damage calculation section 13 may be configured, for example, of a calculation unit such as a CPU (Central Processing Unit), and the shape-damage calculation section 13 may read the simulation program from outside and may execute the program, thereby executing the calculation.

The simulation program may be stored, for example, in a database which is not illustrated, a memory section such as a ROM (Read Only Memory) provided separately, etc. In this case, the simulation program may be implemented in advance, for example, in a component such as the database and the separately-provided memory section. Alternatively, the simulation program may be implemented from the outside, for example, to the component such as the database and the separately-provided memory section. It is to be noted that, when the simulation program is acquired from the outside, the simulation program may be distributed from a medium such as an optical disk and a semiconductor memory, or alternatively, may be downloaded through a transmission means such as Internet.

The output section 14 outputs a simulation result of the predetermined processing that is calculated by the calculation section 12. At this time, the calculation section 14 may output, for example, information such as the processing condition and a parameter used for the calculation, together with the simulation result of the processing. The output section 14 may be configured, for example, of one of units such as a display unit that displays the simulation result, a printing unit that prints out the simulation result, and a recording unit that records the simulation result, or an appropriate combination thereof. It is to be noted that, although an example in which the simulator includes the output section 14 is described in the present embodiment, the present technology is not limited to this example and the output section 14 may be provided outside the simulator.

The simulator may further include a database section that stores various parameters that may be necessary for the calculation process by the shape-damage calculation section 13. Alternatively, such a database section may be provided outside the simulator. It is to be noted that the database section may not be provided when the various parameters that may be necessary for the calculation process is appropriately inputted from the outside.

[Details of Simulation Method]

Description will be given below referring, as an example, to a case in which a process for semiconductor processing is performed as the predetermined processing. As a predicting technique for semiconductor processing, there is a voxel model based on a flux method. This calculation technique uses a simple surface reaction based on cosine law. On the other hand, a more-practical surface reaction model that are established in consideration of even a depth direction from the surface in the normal direction has been proposed, for example, in Literature A "Numerical Simulation Method for Plasma-Induced Damage Profile in $SiO_2$ Etching" by K. Kuboi, T. Tatsumi, S. Kobayashi, J. Komachi, M. Fukasawa, T. Kinoshita, and H. Ansai (Japanese journal of applied physics: Jpn. J. Appl. Phys. 50 (2011) 116501). In a case in which such a practical surface reaction model that are established in consideration of the depth direction is introduced (this may be extremely important in a case of processing in a state where a reaction sediment is thick on the processed surface in which a component such as a contact hole and a Si through via is formed), a large issue may be caused in terms of calculation precision and calculation load. Specific examples thereof may be as follows.

TIGER solves a simple reaction model called a unified model for six faces (in a case of three-dimensional space) of a voxel with the use of a perpendicular component of a gas flux that enters each of the faces of the voxel, thereby calculating a reaction rate (an etching rate or a deposition rate). In order to obtain a more-detailed and more-practical surface reaction, the same surface reaction model is solved for five times at maximum for one voxel that is arranged on the surface, which leads to a large increase in calculation load. Moreover, information of an incident flux component that is parallel to the voxel face is discarded without deriving a normal, and therefore, calculation precision of reaction rate is not favorable.

Moreover, generally, in the voxel model, a voxel arranged in a calculation region is a cube, and an extremely large memory may be necessary especially in calculation upon processing a deep shape, for example, a shape having large film thickness in nanometer order such as shapes of a contact hole and of a Si through via.

As described above, even TIGER has an issue that calculation precision is not favorable and calculation load is increased depending on the calculation state. Moreover, the existing voxel only has existence information that is information on whether or not a voxel is preset and there is no concept of damage (such as a crystal defect in a processed film) in the voxel itself. Therefore, a range in which the existing voxel model can be applied to electric characteristic evaluation for a CMOS device, an image sensor, etc. is limited.

The above-described issue is solved by the simulation method which will be described below. The simulation method according to the present embodiment includes the following calculation processes (i), (ii), and (iii).

(i) A plurality of incident fluxes that enter a center of gravity (i, j) of a voxel are each decomposed into components in unit vector directions that are orthogonal to each other. All of the flux components in the plurality of unit vector directions of the plurality of incident fluxes are summed up for each of the unit vector directions. The plurality of flux components that are orthogonal to each other and have been summed up for each of the unit vector directions are synthesized to be one vector, and thereby, a normal vector at an arbitrary position in a surface of the processing target is calculated.
(ii) The voxel is provided with damage information according to a later-described adding method in addition to spatial position information.
(iii) A voxel size to be used for the subsequent shape-damage calculation is optimized with the use of a reaction rate that is derived at the beginning of the calculation.

Before describing in detail the calculation processes (i), (ii), and (iii), first, description will be given of a flow of the whole calculation process of the simulation method according to the present embodiment referring to FIG. 1. It is to be noted that, in the present embodiment, description will be given of an example of a calculation process that uses a voxel space model as shown in FIGS. 3 to 7. In FIGS. 3 to 7, a hatched region indicates a processing target 60. Further, each of a plurality of rectangular shapes indicates a voxel.

The shape-damage calculation section 13 acquires initial conditions (such as a recipe condition, a unit condition, a pattern structure, and a parameter for calculation) through the input section 11 (step S1), and calculates an initial flux that enters a surface of the processing target 60 at t=0 (step S2). In the calculation of the initial flux, a normal vector of the surface is in a direction perpendicular to the surface with respect to all of the voxels. By solving a surface reaction model (specific but not limitative example thereof may be the surface reaction model disclosed in Literature A) established in consideration of a depth direction with the use of the foregoing, a reaction rate (an etching rate or a deposition rate) at t=0 is calculated (step S3). Using the calculated value, the voxel size is optimized by the calculation process (iii) (step S4). Subsequently, shape development is performed (t→t+dt) at the derived reaction rate and voxels are removed or added (step S5).

Further, a normal vector on the processing surface is derived from the incident flux in each voxel by the calculation process (i) (step S6), and the reaction rate and a damage amount are calculated from the surface reaction model that is established in consideration of the depth direction with the use of the normal vector and a total flux amount in the normal direction (step S7). Next, damage is allocated to the voxels by the calculation process (ii) (step S8), and further, the shape development is performed. When time (t→t+dt) of the shape development becomes termination time (step S9; Y), the process is terminated. When it has not become the termination time (step S9; N), whether or not the reaction rate has varied largely is determined (step S10). In a case where the reaction rate has largely varied (step S10; Y), the process goes to step S4. In a case where the reaction rate has not largely varied (step S10; N), the process goes to step S5. In such a manner, the calculation is repeated until the termination time of the shape development. It is to be noted that a type of the shape development is not limited and may be, for example, the TIGER model, an existing cell-removable model, etc.

Detailed description will be given below of the calculation processes (i), (ii), and (iii). For the sake of convenience, the description will be basically given below assuming two-dimensional calculation. However, this is easily expanded to three-dimensional calculation.

[(i) Calculation of Normal Vector Using Incident Flux]

Figure 3:
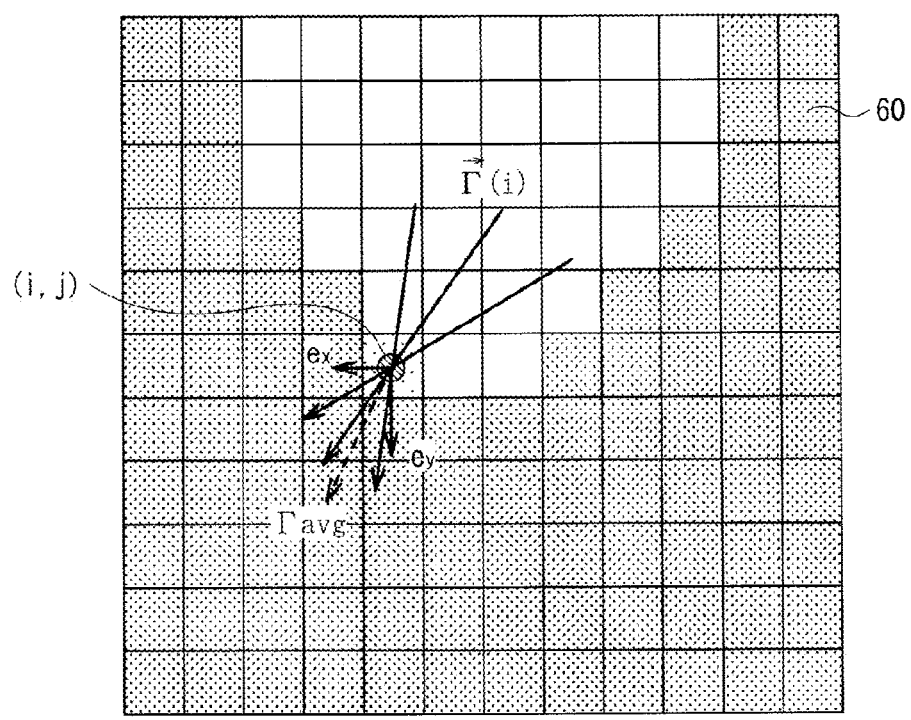
FIG. 3 is an explanatory diagram illustrating an example of a calculation model of calculating a normal vector.

As shown in FIG. 3, focusing on a certain voxel that is arranged on the surface of the processing target 60, consideration is given to a gas flux that enters the center of gravity (i, j) of that certain voxel. Only a flux component that directly enters the voxel from right above the pattern may be considered. In addition thereto, for example, a flux component that is re-emitted from the pattern sidewall and indirectly enters the voxel may also be considered. Further, contribution of a wafer opening ratio, an in-chip opening ratio, a local pattern structure, etc. may also be considered. At this time, a flux vector $\Gamma(i)$ that has entered the voxel from an angle direction i is separated in directions of unit vector components $e_x$ and $e_y$ ($e_x$, $e_y$, and $e_z$, in the case of three-dimensional calculation) that are orthogonal to each other as shown in FIG. 3. Similar operation is performed on fluxes that enter from other angle directions for each angle step, and the $e_x$ components are summed up and the $e_y$ components are summed up. Lastly, the flux component in the $e_x$ direction and the flux component in the $e_y$ direction are linearly synthesized (Expression 1) and a direction of the synthesized vector $\Gamma_{avg}$ is defined as a normal direction and the synthesized vector $\vec{\Gamma}_{avg}$ is defined as a normal vector. Further, an absolute value $|\vec{\Gamma}_{avg}|$ is defined as a total flux amount with respect to the voxel.

$$\vec{\Gamma}_{avg} = \sum_i \vec{\Gamma}(i) = \left( \sum_i [\vec{\Gamma}(i) \cdot \vec{e}_x] \sum_i [\vec{\Gamma}(i) \cdot \vec{e}_y] \right) \quad \text{(Expression 1)}$$

By solving the surface reaction model (specific but not limitative example thereof may be the above-described surface reaction model disclosed in Literature A) that is established in consideration of the depth direction with the use of the normal vector $\Gamma_{avg}$, a reaction rate (an etching rate or a deposition rate) and damage are calculated.

[(ii) Allocation of Damage Value to Voxel]

Damage Da (i, j, R) that is a function of distance R from the center of gravity (i, j) of the voxel is expressed as Expression 2 with the use of dangling bond density θ (i, j, R) that is obtained by solving the surface reaction model (such as the above-described surface reaction model disclosed in Literature A) that is established in consideration of the depth direction.

$$D_a(i,j,R) = V_{voxel} \times \theta(i,j,R) \times \rho \quad \text{(Expression 2)}$$

Figure 4:
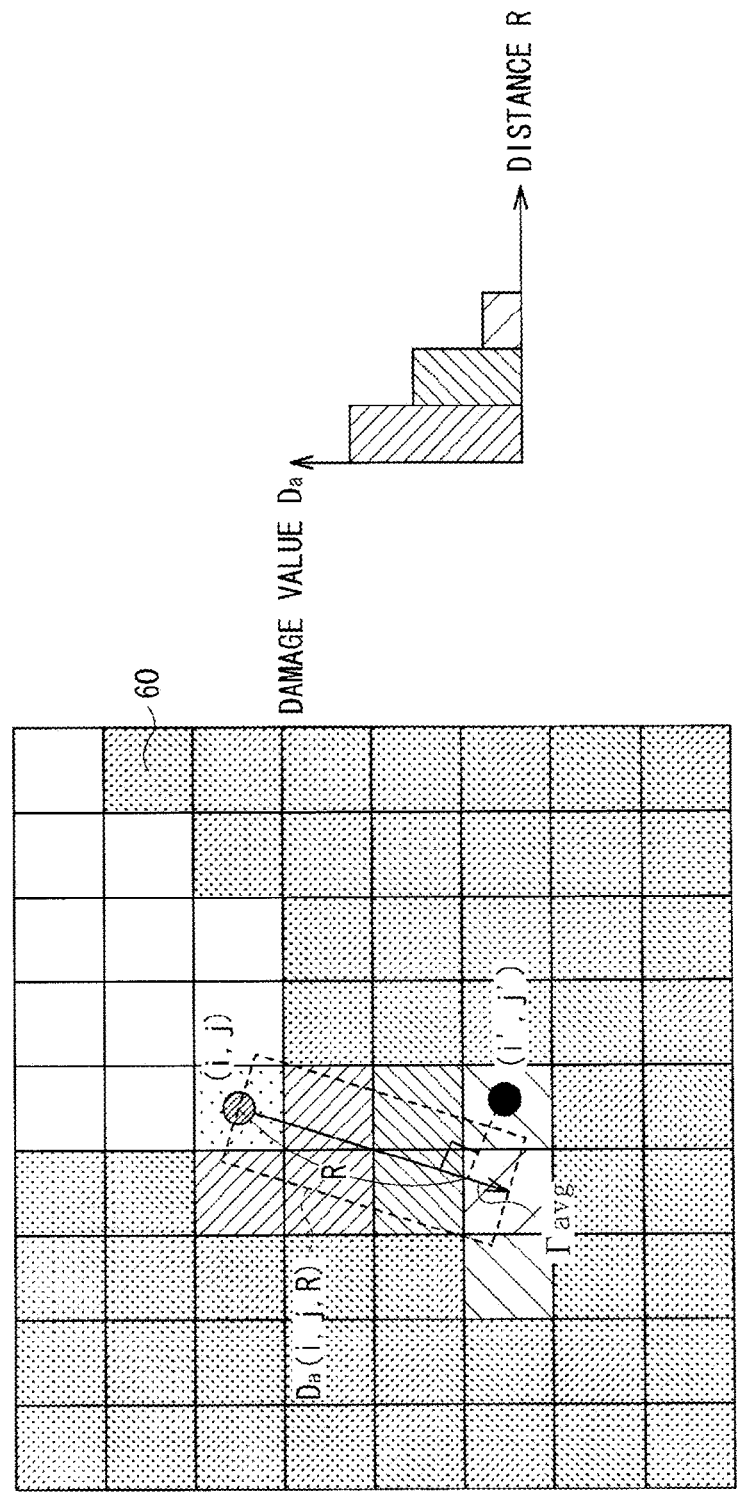
FIG. 4 is an explanatory diagram illustrating an example of a calculation model of damage.

Herein, $V_{voxel}$ is a volume of a voxel and ρ is density of the film to be etched. However, the surface reaction model is not limited to that described above as long as the surface reaction model gives θ(R). As shown in FIG. 4, the above-described Da value is allocated in a region (a region surrounded by a dashed line in the drawing) that has a width (which is parametized) perpendicular to the normal direction, according to the distance R that is to the center of gravity (i, j) of the voxel from an intersection of the normal vector and a line perpendicular to the normal line extending from a center of gravity (i', j') of the voxel to which the damage is allocated.

Figure 5:
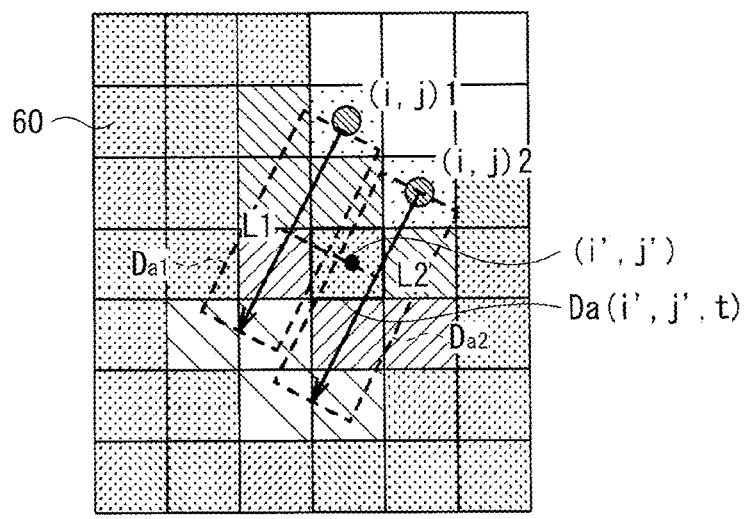
FIG. 5 is an explanatory diagram illustrating an example in which damage is allocated, based on two normal vectors, to a voxel that exists on both the two normal vectors.
Figure 6:
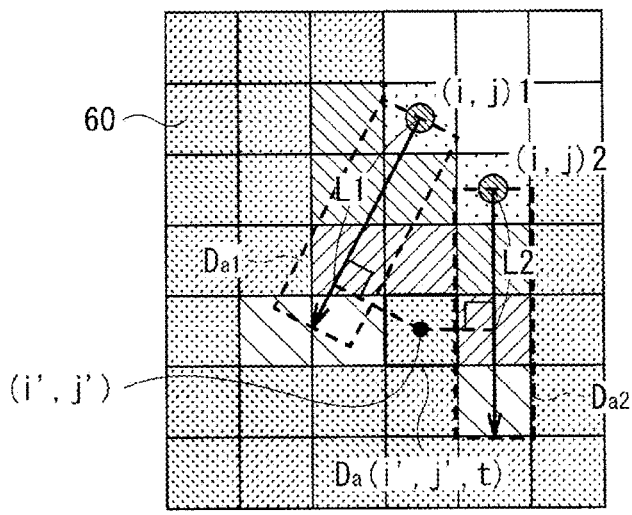
FIG. 6 is an explanatory diagram illustrating an example in which damage is allocated, based on the two normal vectors, to a voxel that exists outside of regions of the two normal vectors.

In the case in which the damage is allocated in such a manner, cases shown in FIGS. 5 and 6 may be considered. In FIGS. 5 and 6, a normal vector is calculated for each of a first position (i, j) 1 and a second position (i, j) 2 that are adjacent to each other on the surface of the processing target 60. Specifically, a first normal vector at the first position (i, j) 1 and a second normal vector at the second position (i, j) 2 are calculated. In this case, first damage $D_{a1}$ caused by the first normal vector is allocated to a voxel that exists only in a first region that has a predetermined width and includes the first normal vector. Further, second damage $D_{a2}$ caused by the second normal vector is allocated to a voxel that exists only in a second region that has a predetermined width and includes the second normal vector.

Moreover, the damage is allocated as follows in a case (FIG. 5) in which there is a voxel that exists in both the first region and the second region and in a case (FIG. 6) in which there is a voxel that exists outside both the first region and the second region.

(1) a case in which there is a voxel that exists in both the first region and the second region (FIG. 5)

(a) Simply add the two damage values ($D_{a1}$, $D_{a2}$).

(b) Allocate the damage value ($D_{a1}$ or $D_{a2}$) that is closer to the center of gravity (i', j') of the relevant voxel.

(c) Add the two damage values at a ratio of areas (volume, in the case of three-dimensional calculation) in which the relevant voxel overlaps the respective first and second regions (Expression 3).

$$D_a(i', j', t) = \frac{S_1}{S_1 + S_2} D_{a1} + \frac{S_2}{S_1 + S_2} D_{a2} \quad \text{(Expression 3)}$$

(d) Allocate the damage values in inverse proportion to the respective distances ($L_1$, $L_2$) to the center of gravity (i', j') of the relevant voxel (Expression 4).

$$D_a(i', j', t) = \frac{L_2}{L_1 + L_2} D_{a1} + \frac{L_1}{L_1 + L_2} D_{a2} \quad \text{(Expression 4)}$$

(2) a case (FIG. 6) in which there is a voxel that exists outside both regions (a) Allocate the damage value ($D_{a1}$ or $D_{a2}$) that is closer to the center of gravity (i', j') of the relevant voxel.

(b) Allocate the two damage values obtained through interpolation calculation. For example, allocate the damage values in inverse proportion to the respective distances ($L_1$, $L_2$) to the center of gravity (i', j') of the relevant voxel.

$$D_a(i', j', t) = \frac{L_2}{L_1 + L_2} D_{a1} + \frac{L_1}{L_1 + L_2} D_{a2} \quad \text{(Expression 5)}$$

The width parameter of the allocation region and one allocation method of (a) to (d) of (1) described above or one of (a) and (b) of (2) described above are set upon inputting the initial conditions, and damage information is attached to the voxels by the set method upon the simulation.

[(iii) Optimization of Voxel Size]

Figure 7:
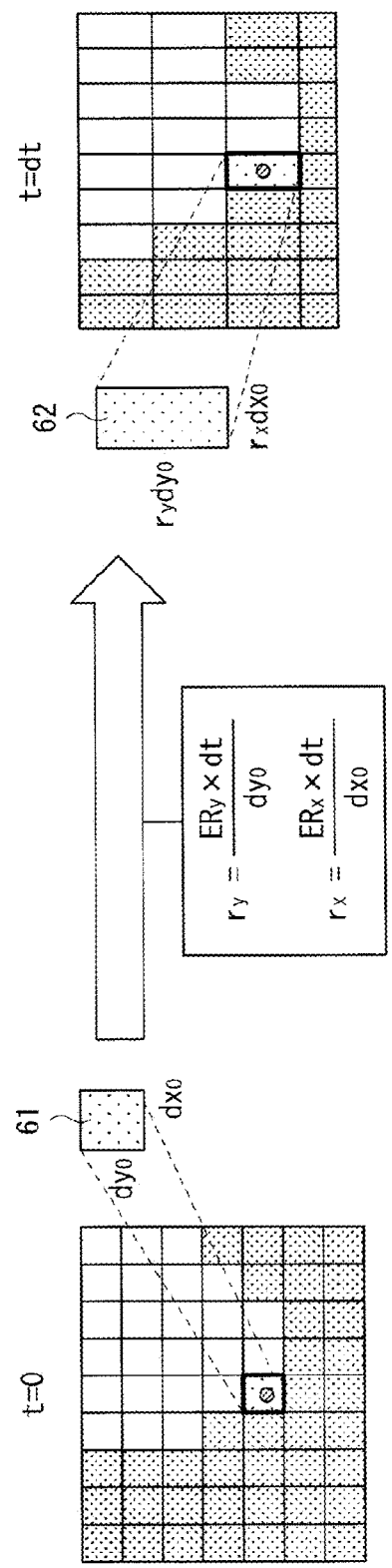
FIG. 7 is an explanatory diagram on optimization of a voxel size.

For example, as shown in FIG. 7, an initial voxel size ($dx_0$, $dy_0$) is set as the initial parameter. For example, $dx_0$ may be 1 nm and $dy_0$ may be 1 nm. Thereafter, in a step of time period at t=0, the surface reaction model is solved with the use of the normal vector and the total flux amount in the normal direction that are derived in the process (i). Modified parameters $r_x$ and $r_y$ of the voxel size are derived by Expressions 6 and 7 based on reaction rates (an etching rate or a deposition rate) ERx and ERy in the direction of the derived unit vector components $e_x$ and $e_y$. This means that the voxel size is optimized to a size in a degree that the voxel is etched (or deposited) in the step of time period (dt) (FIG. 7).

$$r_y = \frac{ER_y \times dt}{dy_0} \quad \text{(Expression 6)}$$

$$r_x = \frac{ER_x \times dt}{dx_0} \quad \text{(Expression 7)}$$

For example, the modified parameters after the optimization may be $r_x$=1 and $r_y$=3. Moreover, when t=0, voxels are set from the surface of the initial shape to several layers in the depth direction. At the time when the above-described optimization of the voxel size is completed, memory for all voxels is secured on the program, and a shape and damage distribution are calculated as shown in FIG. 1 thereafter. During the development of the shape by each step, in a case in which an etching rate $ER_{1m}$ in a voxel in the first row and in the mth column is largely varied in a step t+dt, for example, when the following Expression 8 is satisfied, the voxel size is optimized again, in particular, $r_x$ and $r_y$ are defined again as in the flow shown in FIG. 1. It is to be noted that the determination parameter α is set in the program upon acquiring the initial conditions.

$$\Delta ER_{lm} = \left| \frac{ER_{lm}(t+dt) - ER_{lm}(t)}{ER_{lm}(t+dt)} \right| \equiv \alpha > 0.5 \quad \text{(Expression 8)}$$

Figure 13:
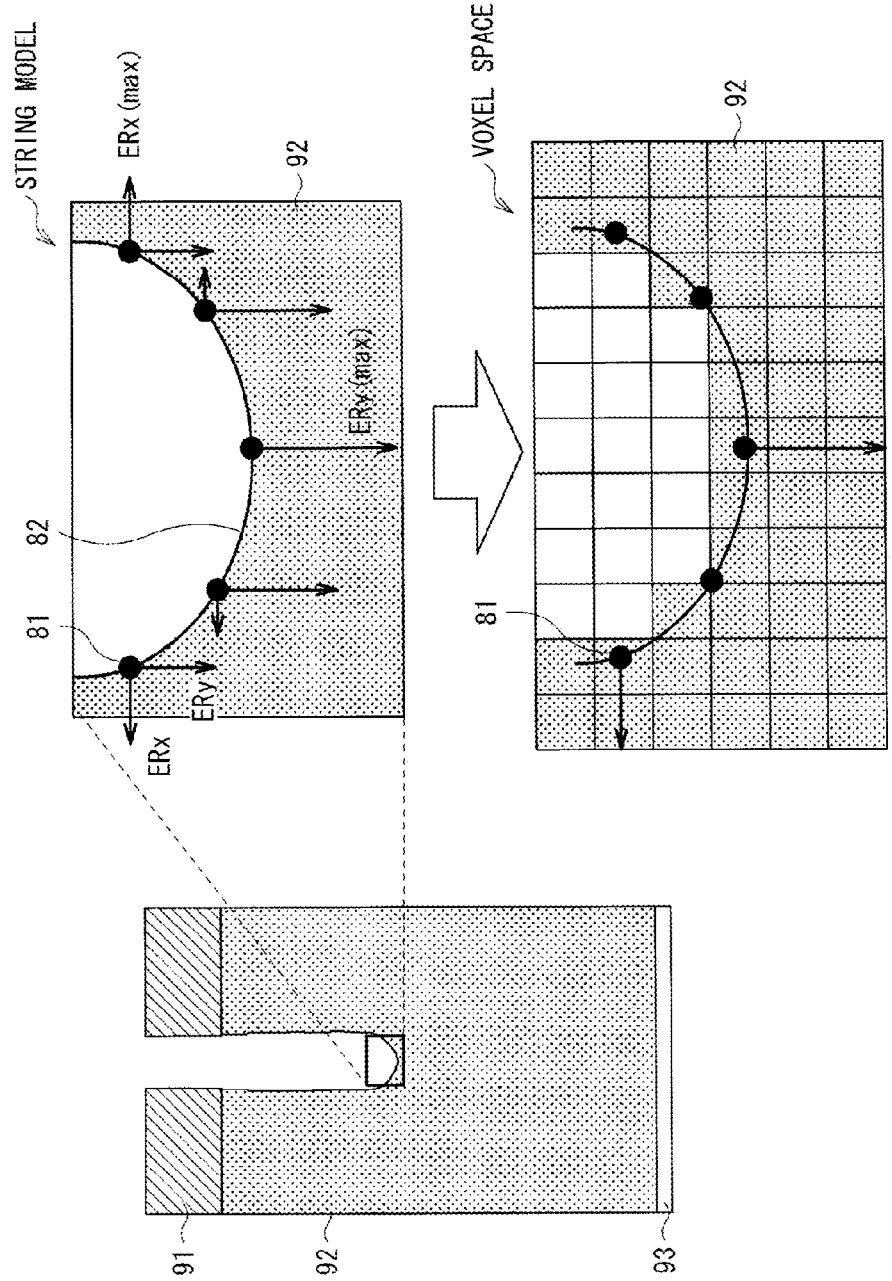
FIG. 13 is an explanatory diagram illustrating an example of a simulation method according to a second embodiment.
Figure 14:
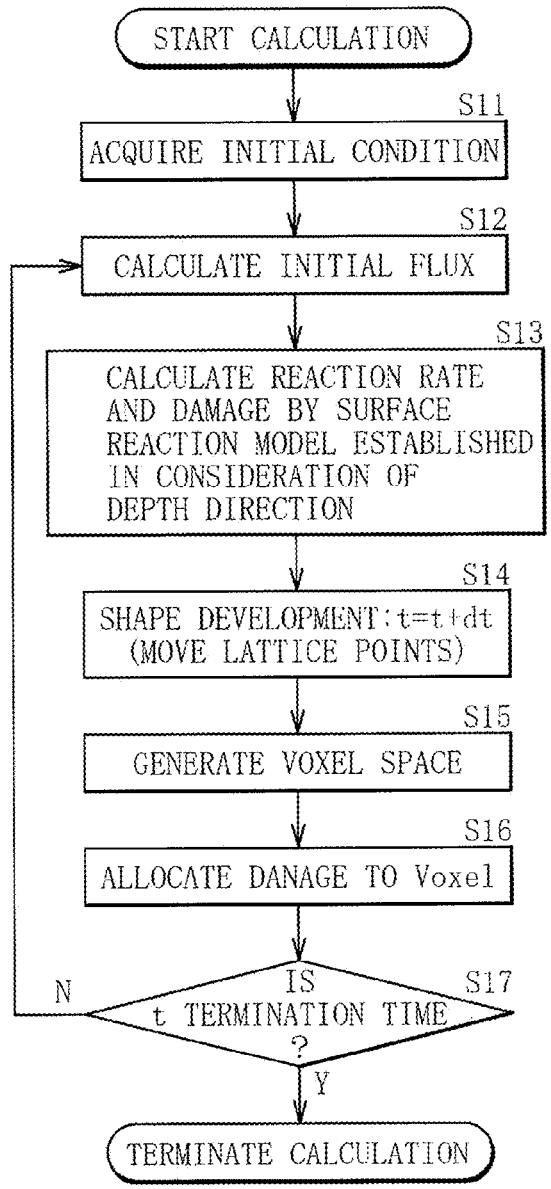
FIG. 14 is a flow chart illustrating an example of the simulation method according to the second embodiment.

In the above-described calculation technique according to the present embodiment, voxel space is generated in advance and shape development and damage distribution are calculated with the use of the voxel. However, the calculation technique according to the present embodiment is applicable to a case that does not have the concept of voxel in advance such as the string model. Specifically, that is a hybrid model of the string model and the voxel model in which new voxel space is associated with the vicinity of the processing surface formed of lattice points, and damage distribution is expressed by allocating damage to the voxel space by the method in (ii). This will be described in a second embodiment (FIGS. 13 and 14).

Moreover, the calculation technique according to the present embodiment is not limitedly applied to etching but is widely applicable to any processing process that uses plasma such as CVD (Chemical Vapor Deposition) and PVD (Physical Vapor Deposition). The type of the shape development model may be any type.

Figure 15:
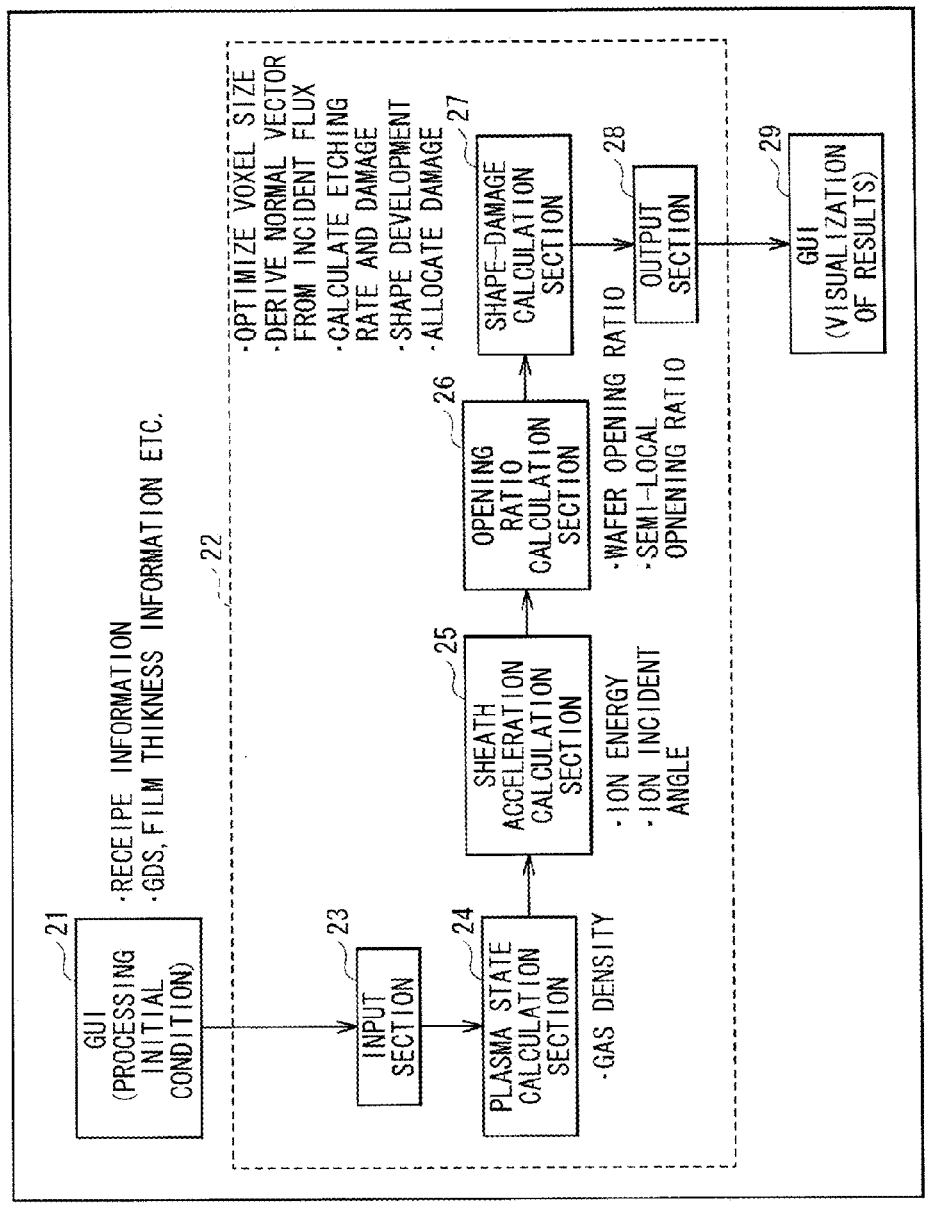
FIG. 15 is a block diagram illustrating a configuration example of simulation software (program) according to a third embodiment.
Figure 16:
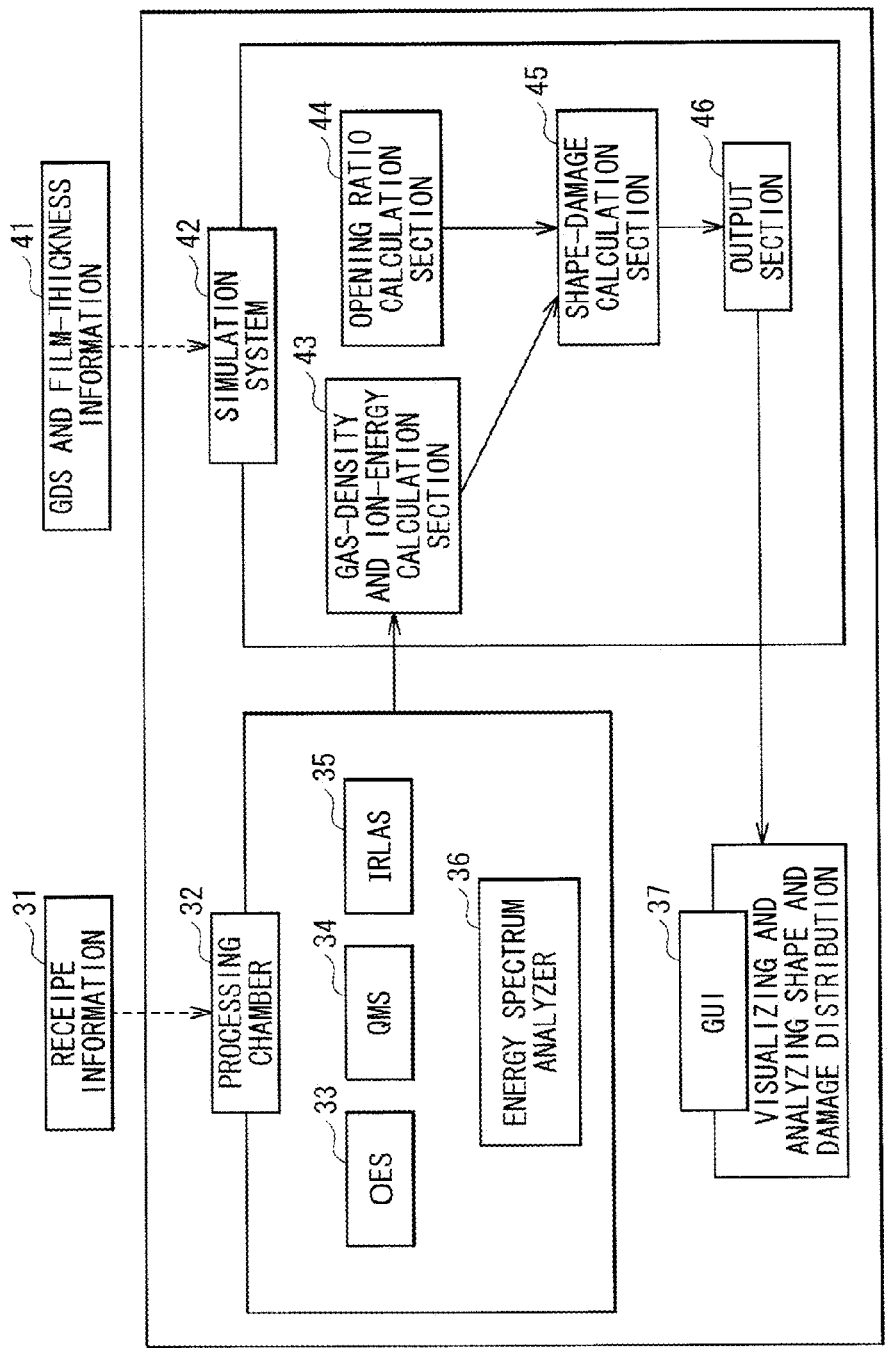
FIG. 16 is a block diagram illustrating a configuration example of a processing unit according to a fourth embodiment.
Figure 17:
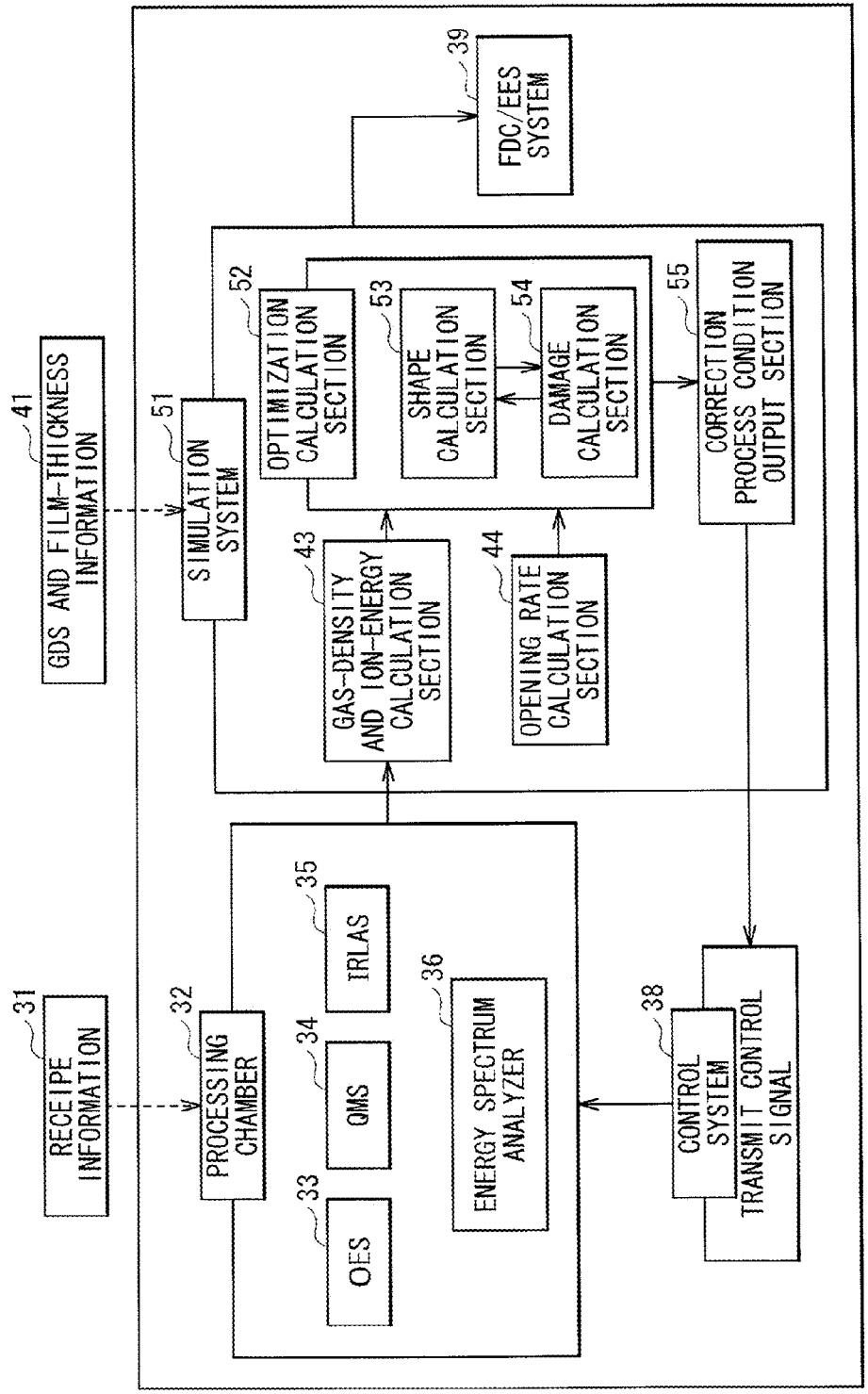
FIG. 17 is a block diagram illustrating a configuration example of a processing unit according to a fifth embodiment.

Simulation software and a processing unit (having functions such as visualizing simulation results and automatic feedback to process control) provided with shape and damage-distribution calculation including the processes (i), (ii), and (iii) will be described later in detail in third to fifth embodiments (FIGS. 15 to 17).

[Effects]

The following effects are obtained by using the simulation method according to the present embodiment described above.

(1) A normal vector is derived more precisely than in the existing voxel model in which a normal vector of a surface is derived based on position information of adjacent voxels. Accordingly, calculation of a reaction rate (etching rate, deposition rate), of a shape, and of damage distribution is achieved with high precision and with high speed.

(2) Since also damage information is attachable to the voxels, damage distribution is visualized and process conditions that allow damage reduction is predicted in detail in simulation with the use of the voxel model. Therefore, influence of the process conditions on electric characteristics of a device is predicted and analyzed in further-multiple ways compared to in the existing methods.

(3) Since the voxel size is optimized reflecting the reaction rate, shape and damage distribution are predictable with lower calculation load compared to in the existing voxel model.

(4) Process control in implement of the shape-damage simulation to a processing unit and in-situ process control using the shape-damage simulation are performed with high precision (see fourth and fifth embodiments which will be described later).

(5) Processing is allowed to be performed while confirming the simulation results of the shape and the damage distribution, and therefore, TAT (Turn-Around Time) in constructing the process conditions is expected to be shortened (see the fourth embodiment which will be described later).

(6) A process correction value that is obtained by the highly-precise simulation prediction is fed back sequentially to the processing condition. Therefore, highly-precise processing, low damage processing, and improvement in yield are expected (see the fifth embodiment which will be described later).

Next, description will be given of actual calculation examples using the simulation method according to the present embodiment.

1-2. First Calculation Example

Derivation of Normal Vector $\Gamma_{avg}$ in Voxel Model

Figure 8:
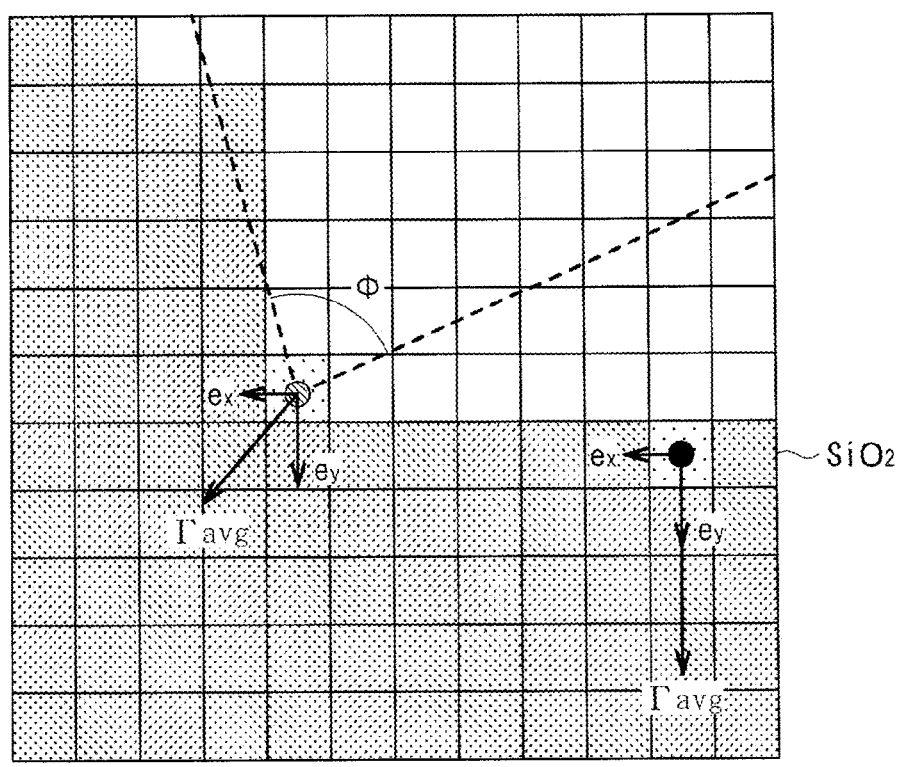
FIG. 8 is an explanatory diagram illustrating a first calculation example in which the simulation method according to the first embodiment was used.

FIG. 8 illustrates a first calculation example. FIG. 8 illustrates a two-dimensional contact hole etching of a $SiO_2$ film using a CCP (Capacitively Coupled Plasma) dry etching unit. A resist mask having a hole diameter of 200 nm and a film thickness of 400 nm was used, the voxel size was 3 nm×3 nm, and the following process conditions were used.

(Process Conditions)
type and flow rate of gas: $C_4F_8/O_2/Ar=11/8/400$ sccm
pressure: 30 mTorr
Vpp=1450V
wafer temperature: 30 degrees Celsius At this time, using the above-described process conditions and gas flux data in a chamber that was obtained by plasma monitoring using OES (Optical Emission Spectroscopy), QMS (Quadrupole Mass Spectroscopy), and IRLAS (Infrared-diode Laser Absorption Spectroscopy), in the state shown in FIG. 8, the normal vector $\Gamma_{avg}$ in a two-dimensional space was derived with the use of the above-described calculation process (i) from flux vectors of ions ($CF^+$, $CF_3^+$, $CF_2^+$, $C_2F_4^+$, $F^+$, $Ar^+$) that entered the voxels in sidewalls and in a hole processing bottom portion and from flux vectors of radicals ($CF_2$, CF, F, $CF_3$, O). Only flux components entered directly were considered. A trace angle step was set to be 1 degree, and the normal vector $\Gamma_{avg}$ was derived in a region $\Phi$ (FIG. 8) extending from the focused voxel and including an expected pattern frontage. The derived normal vector $\Gamma_{avg}$ coincided with a normal vector (derived from position information of two adjacent lattice points) that was obtained by a two-dimensional string model.

1-3. Second Calculation Example

Figure 9:
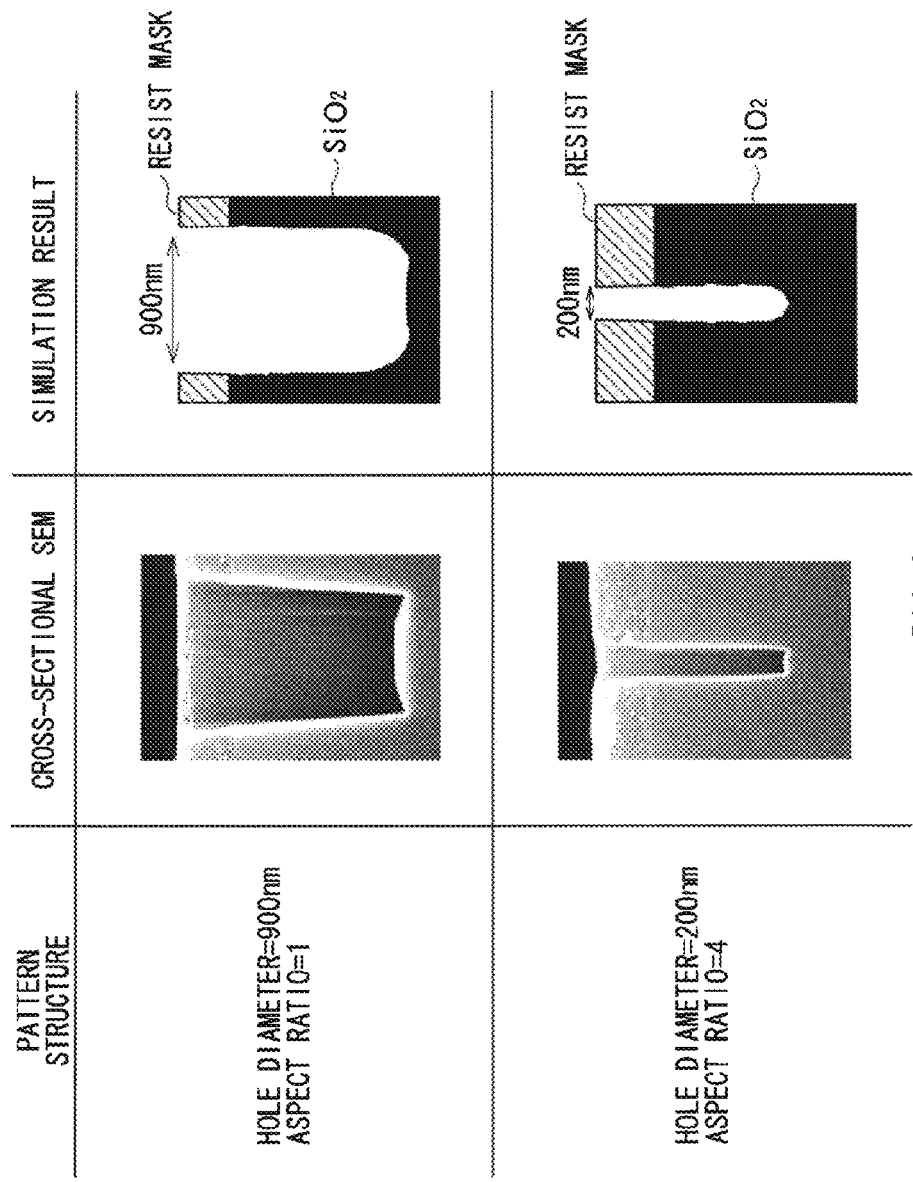
FIG. 9 is an explanatory diagram illustrating a second calculation example in which the simulation method according to the first embodiment was used.

Shape Simulation Using Surface Reaction Model Additionally in Consideration of Depth Direction in First Calculation Example FIG. 9 illustrates a second calculation example. Processing simulation was performed with the use of process conditions similar to those in the first calculation example (it is to be noted that etching time was 160 seconds) on an initial pattern of a resist mask having a hole diameter of one of 200 nm and 900 nm and having a film thickness of 400 nm. Using the normal vector $\Gamma_{avg}$ obtained in the first calculation example and a flux amount in the direction thereof, film thickness and an etching rate of a reaction sediment in each voxel were calculated with the use of the surface reaction model (such as the above-described surface reaction model disclosed in Literature A) established in consideration of the depth direction, and shape development was calculated. Incidentally, only direct entrance of the incident ions was taken into consideration (scattering effects on the pattern surface were ignored). As shown in FIG. 9, depth of the processing and a shape seen in a cross-sectional SEM (Scanning Electron Microscope) were reproduced.

1-4. Third Calculation Example

Optimization of Voxel Size

Figure 10:
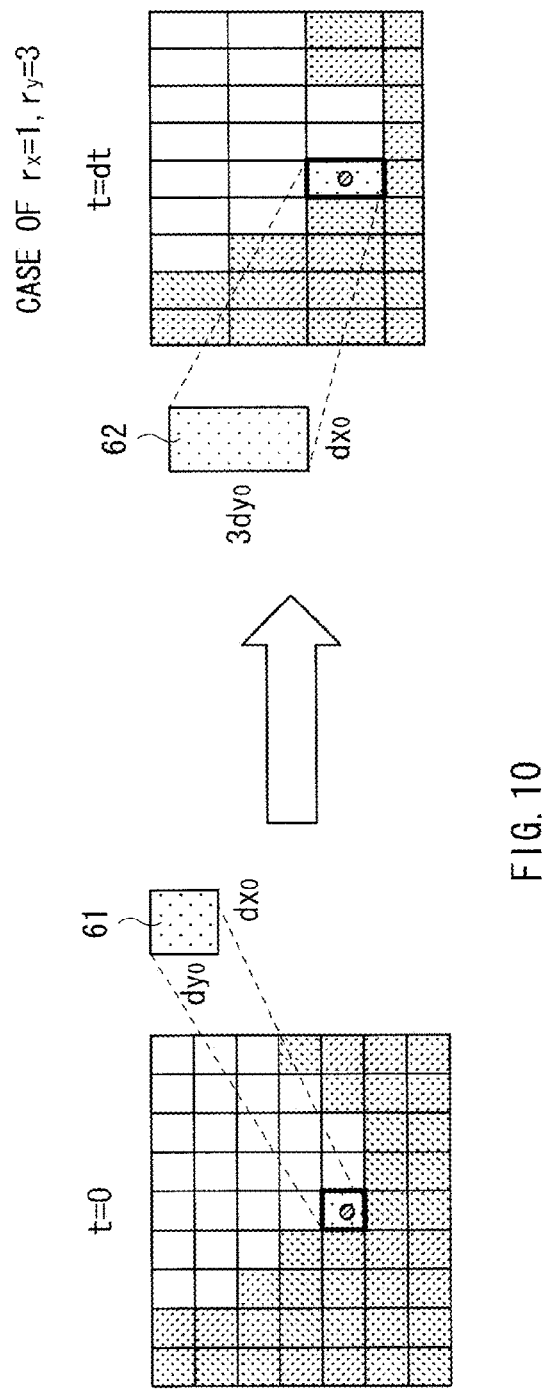
FIG. 10 is an explanatory diagram illustrating a third calculation example in which the simulation method according to the first embodiment was used.

FIG. 10 illustrates a third calculation example. FIG. 10 illustrates an initial voxel 61 and a calculation result of a voxel 62 after optimizing the initial voxel 61. Contact hole processing was assumed under the process conditions in the foregoing first calculation example. Initial values of the voxel size were $(dx_0, dy_0)=(1$ nm, 1 nm). An etching rate in a vertical direction, an etching rate in a horizontal direction, and a step of time period dt that were calculated at the beginning of the calculation by the surface reaction model (such as the above-described surface reaction model disclosed in Literature A) taking into consideration the depth direction were 600 nm/min, 10 nm/min, and 0.3 seconds, respectively. At this time, using the above-described calculation process (iii), $r_y=3$ and $r_x=0.06$ were obtained. At this time, $r_x$ was sufficiently small. Therefore, $r_x$ was set as 1 for the sake of reduction in memory capacity, and it was set that a voxel in the horizontal direction was removed in a step of time period in which an integrated etching amount in the horizontal direction exceeded 1 nm which was lateral width of the voxel.

1-5. Fourth Calculation Example

Two-Dimensional Damage Distribution

Figure 11:
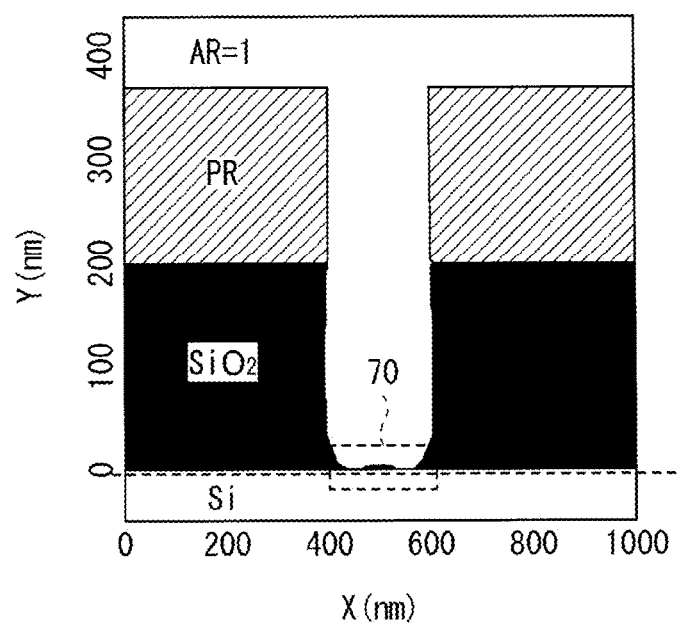
FIG. 11 is an explanatory diagram illustrating a fourth calculation example in which the simulation method according to the first embodiment was used.
Figure 12:
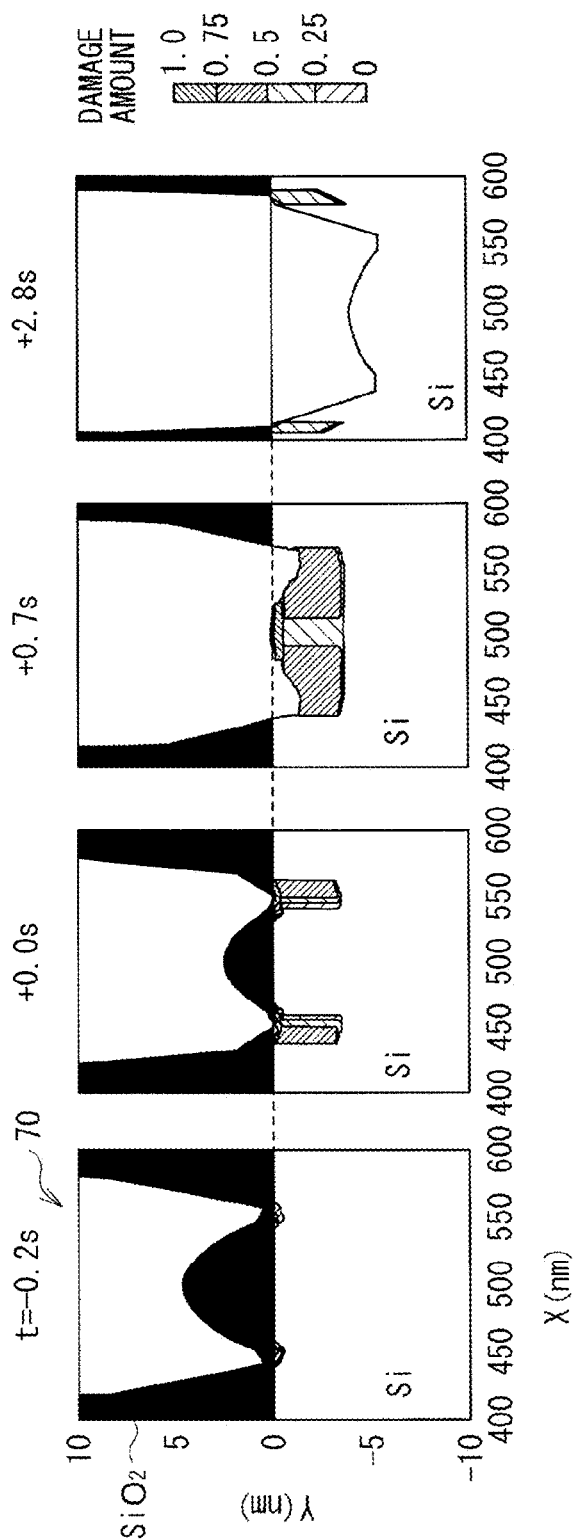
FIG. 12 is an explanatory diagram illustrating the fourth calculation example in which the simulation method according to the first embodiment was used.

FIGS. 11 and 12 illustrate a fourth calculation example. FIGS. 11 and 12 illustrate results of simulating, upon processing a contact hole having an aspect ratio (AR) of 1 in a $SiO_2$ film on a Si substrate, distribution of damage (Si crystal defect) to be caused on the underlying Si substrate. FIG. 12 illustrates the simulation result over time enlarging a surface region 70 of the contact hole bottom portion shown in FIG. 11. This corresponds to a state in which etching was performed for 3 seconds from the time when the damage was started to be caused on the underlying Si substrate. Processing conditions, normal derivation, etc. corresponded to those in the above-described first to third calculation examples. For allocating damage, the above-described method 1 (b) in (ii) was adopted.

2. Second Embodiment

Next, description will be given of a display unit according to a second embodiment of the present disclosure. It is to be noted that description similar to that of the above first embodiment will be appropriately omitted.

In the above-described first embodiment, description has been given of the technique of generating voxel space in advance and calculating shape development and damage distribution with the use of the voxels. However, in the present embodiment, the concept of voxel is not used in initial calculation and calculation is performed with the use of the string model. Specifically, the shape of the surface of the processing target is expressed using the string model that includes a plurality of lattice points, and shape development based on a normal vector is performed with the use of the string model. Thereafter, the voxel space is generated in the vicinity of the surface of the processing target that is expressed by the string model and a plurality of voxels are arranged therein. Damage caused on the processing target by a plurality of incident fluxes are determined based on the normal vector, and the determined damage is allocated to the plurality of voxels.

FIG. 14 illustrates a general flow of a simulation method according to the present embodiment. The shape-damage calculation section 13 (FIG. 2) acquires initial conditions (such as a recipe condition, a unit condition, a pattern structure, and a parameter for calculation) through the input section 11 (step S11). The shape-damage calculation section 13 derives, with the use of the string model, a normal vector on a processing surface from incident fluxes by the foregoing calculation process (i) described above in the first embodiment (step S12). Subsequently, the reaction rate and the damage amount are calculated by a surface reaction model (specific but not limitative example thereof may be the above-described surface reaction model disclosed in Literature A) established in consideration of the depth direction with the use of the foregoing normal vector and a total flux amount in the normal direction (step S13). Subsequently, shape development (t→t+dt) is performed at the derived reaction rate and lattice points in the string model are moved (step S14). Subsequently, new voxel space is generated in the vicinity of the processing surface that is expressed by the string model (step S15), and damage is allocated to the voxel space based on the foregoing calculation process (ii) described above in the first embodiment (step S16). When time (t→t+dt) of the shape development becomes termination time (step S17; Y), the process is terminated. When the time of the shape development has not reached the termination time (step S17; N), the process goes to the process in the step S12.

FIG. 13 illustrates an example of a calculation model of the shape development in the present embodiment. Two-dimensional string model is used for the shape development. FIG. 13 illustrates an example of a model in which a processing target 92 (for example, a $SiO_2$ film) and a resist 91 are laminated on an underlayer 93 (for example, a Si substrate) and processing is performed to form a contact hole. By solving the surface reaction model (such as the above-described surface reaction model disclosed in Literature A) established in consideration of the depth direction with the use of the normal vector and a flux in the direction of the normal vector, a reaction rate (an etching rate or a deposition rate) and a damage value at each lattice point 81 in the string model is calculated. Subsequently, voxel space is associated with a processing surface 82 that is formed by connecting the lattice points 81. Here, the magnitude of the voxel space (x, y) is determined as follows. A maximum value ERy(max) of a vertical component ERy and a maximum value ERx(max) of a horizontal component ERx of the reaction rate of the lattice points 81 are searched. A region (a hatched region in FIG. 13) that extends from a lattice point that is located at a deepest position to ERy(max)×dt×β and extends from a lattice point that is located at an outermost position to ERx(max)×dt×β is associated as the voxel space with the processing surface 82. Here, dt is a step of time period and β is a parameter related to determination of the voxel space. It is to be noted that, space above the processing surface in the normal direction is ignored. Damage distribution is expressed in this voxel space by the foregoing allocation technique in (ii) described above in the first embodiment.

It is to be noted that, although the shape development is performed using the string model in the present embodiment, the calculation may be performed not by the string model but, for example, by a model such as a level-set model. In the level-set model, an analysis region is divided in a lattice shape (in a mesh shape), reaction process analysis is performed for each lattice point (grid), and a surface shape and variation thereof over time are calculated using a level-set function.

3. Third Embodiment

Next, description will be given of a display unit according to a third embodiment of the present disclosure. It is to be noted that description similar to that of the above first and second embodiments will be appropriately omitted.

In the present embodiment, description will be given of a specific example of simulation software (program) to which the simulation method of the above-described first or second embodiment is applied. FIG. 15 illustrates a functional configuration example of the simulation software. The simulation software includes a GUI (Graphical User Interface) 21 provided for inputting the initial condition and a calculation engine section 22. The calculation engine section 22 includes an input section 23 for transferring the value of the initial condition to the calculation engine section 22, a plasma state calculation section 24, a sheath acceleration calculation section 25, an opening ratio calculation section 26, a shape-damage calculation section 27, an output section 28, and a GUI 29 for visualizing a simulation result.

An executing platform of this simulation software may be any of, for example, Windows (registered trademark), Linux (registered trademark), Unix (registered trademark), and Mac (registered trademark). Further, the GUIs 21 and 29 may be applicable to any configuration language such as OpenGL, Motif, and tcl/tk. A programming language of the calculation engine section 22 may be any type of programming language such as C, C+, Fortran, and JAVA (registered trademark).

From the GUI 21, recipe information, unit information, parameters for calculation, GDS (Graphic Design System) data, and film thickness information are inputted as the initial conditions. The plasma state calculation section 24 calculates density of each gas type (an ion and a radical) in bulk plasma based on the initial conditions. The sheath acceleration calculation section 25 calculates an ion energy distribution function (IEDF) and an ion angular distribution function (IADF) with respect to a pattern as a final state of an ion that is generated in the bulk plasma and is accelerated (including collision with the radical) in a sheath. For these information, database obtained by, for example, actual measurement may be used.

The opening ratio calculation section 26 calculates, based on the GDS data and the film thickness information, influence of a wafer opening ratio and a semi-local opening ratio (in-chip opening ratio) on flux (that are in a linear relation). Based on these incident fluxes of the ion and of the radical, the shape-damage calculation section 27 calculates shape-damage distribution according to the calculation flow shown in FIG. 1 or FIG. 14. After the calculation is terminated, results of position information (processing shape information such as line width, taper, and a mask residual film) of voxels, damage distribution, film thickness of reaction sediments (polymers and oxides) are outputted from the output section 28 to a file. Further, these results may be also visualized by the GUI 29. The data may be outputted or visualized during the calculation in real time.

4. Fourth Embodiment

Next, description will be given of a display unit according to a fourth embodiment of the present disclosure. It is to be noted that description similar to that of the above first to third embodiments will be appropriately omitted.

In the present embodiment, description will be given of a configuration example of a semiconductor processing unit capable of real-time visualizing of shape-damage distribution to which the simulation method of the above-described first or second embodiment is applied. FIG. 16 illustrates the configuration example of the semiconductor processing unit.

The semiconductor processing unit includes a processing chamber 32, a simulation system 42, and a visualization system (GUI 37). The processing chamber 32 is a CCP. However, the processing chamber 32 may be other plasma generating mechanism such as mechanisms of an ICP (Inductively Coupled Plasma) type and of an ECR (Electron Cyclotron Resonance) type.

The simulation system 42 includes a gas-density and ion-energy calculation section 43, an opening ratio calculation section 44, a shape-damage calculation section 45, and an output section 46. The shape-damage calculation section 45 further includes a flux module, a voxel-size optimization module, a normal module, an etching-rate and damage module, a shape development module, and a damage allocating module. The simulation system 42 has a function configuration substantially similar to that of the calculation engine section 22 (FIG. 15) in the above-described third embodiment.

The processing chamber 32 is implemented with an OES 33, a QMS 34, an IRLAS 35, and an energy spectrum analyzer 36 that are provided for acquiring input data necessary for the simulation, and plasma is continuously monitored with the use of the foregoing components during the processing. The sampling rate may be, for example, 0.1 s. Information acquired by the foregoing components during the processing and recipe information 31 is transferred to the simulation system 42, and gas density and ion energy are calculated. Further, the shape-damage calculation section 45 takes into consideration the contribution to the flux of the wafer opening ratio and the semi-local opening ratio (in-chip opening ratio) (that are in a linear relation) that are calculated by the opening ratio calculation section 44 with the use of GDS and film-thickness information 41, and performs the calculation according to the calculation flow shown in FIG. 1 or FIG. 14. The foregoing process is sequentially repeated during the processing, and thereby, the processing is actually performed while confirming prediction of the shape variation and the damage distribution in real time by the visualization system using the GUI 37.

5. Fifth Embodiment

Next, description will be given of a display unit according to a fifth embodiment of the present disclosure. It is to be noted that description similar to that of the above first to fourth embodiments will be appropriately omitted.

In the present embodiment, description will be given of a configuration example of a semiconductor processing unit that achieves a process control system based on simulation to which the simulation method of the above-described first or second embodiment is applied. FIG. 17 illustrates the configuration example of the semiconductor processing unit.

The semiconductor processing unit includes the processing chamber 32, a simulation system 51, a control system 38, and an FDC/EEC (Fault Detection and Classification/Equipment Engineering System) system 39. The processing chamber 32 is a CCP. However, the processing chamber 32 may be other plasma generating mechanism such as mechanisms of an ICP type and of an ECR type.

The simulation system 51 includes the gas-density and ion-energy calculation section 43, the opening ratio calculation section 44, an optimization calculation system 52, and a correction process condition output section 55. The optimization calculation system 52 includes a shape calculation section 53 and a damage calculation section 54. The simulation system 51 has a function configuration substantially similar to that of the calculation engine section 22 (FIG. 15) in the above-described third embodiment.

The processing chamber 32 is implemented with the OES 33, the QMS 34, the IRLAS 35, and the energy spectrum analyzer 36 that are provided for acquiring input data necessary for the simulation, and plasma is continuously monitored with the use of the foregoing components during the processing. The sampling rate may be, for example, 0.1 s. Information acquired by the foregoing components during the processing and the recipe information 31 are transferred to the simulation system 51, and gas density and ion energy are calculated. When the calculation time period is sufficiently shorter than the actual processing time period, all of the gas density and the ion energy may be determined by the reactor simulation. Further, the optimization calculation section 52 takes into consideration the contribution to the flux of the wafer opening ratio and the semi-local opening ratio (in-chip opening ratio) (that are in a linear relation) that are calculated by the opening ratio calculation section 44 with the use of the GDS and film-thickness information 41, and calculates the etching rate and the damage distribution according to the calculation flow shown in FIG. 1 or FIG. 14.

When the shape and the damage are out of the desirable spec (for example, when a variation value of line width may be ±10% or more of a desirable value of 70 nm and a damage amount may be increased by 50% of a desirable value of $10^{11}/cm^2$), process parameters may be varied in order of a gas flow rate, gas pressure, application power, and wafer temperature, for example, by ±50% (this determination condition value is parameterized), and the calculation in FIG. 1 or FIG. 14 may be performed. Thus, correction conditions that achieve shape and damage within the desirable spec are found. The correction conditions are transferred to the control system 38 thorough the correction process condition output section 55. The control system 38 transmits a control signal so that the processing chamber 32 satisfies the correction conditions. The processing chamber 32 changes the parameters relevant to the correction conditions and continues the processing. If a solution that satisfies the spec is not found in the simulation, an alert signal is transmitted to the FDC/EES system 39 and the unit is stopped thereby.

Concerning the optimization calculation part of the simulation system 51, when the calculation time period has a scale equivalent to or larger than that of the actual processing time period, an optimal solution may be found not by calculating shape and damage online as described above but by a method in which database of shape and damage with respect to various process conditions is prepared in advance and the optimal solution is searched and interpolated utilizing the database.

6. Sixth Embodiment

Next, description will be given of a display unit according to a sixth embodiment of the present disclosure. It is to be noted that description similar to that of the above first to fifth embodiments will be appropriately omitted.

6-1. Third Example of Simulation Method

Example of Method of Integrating Etching Amounts

In the above-described calculation technique of the voxel model (TIGER) based on the flux method, upon the shape development, in order to stably remove the processing surface, a large step of time period (for example, 5 s) is determined at the beginning of the calculation so that all voxels that include a voxel having a slowest etching rate are collectively removed. This is similarly applicable to a typical voxel model. Therefore, the step of time period of the surface reaction module may have to be a large value that is the same as the value of the step of time period of the shape module.

However, in general, a surface reaction phenomenon occurs in an extremely-short time period compared to a shape variation phenomenon. Therefore, when the step of time period is large, followability with respect to the flux variation is not favorable and precision in etching rate is lowered. As a result, the simulation results may be largely different from, for example, the actual shape, the actual damage distribution, and the like. Moreover, even when the step of time period is set at a large value at the beginning of the calculation, the etching rate may be lowered and may cause the voxel not to be removed while the etching proceeds. The voxel that has not been removed once is not removed throughout the calculation (as long as the same process is used). As a result, the surface of the processed shape may have a structure with large asperities. When the voxel size is reduced to deal with the above-described issue, memory may be enormous, in particular, upon calculating a high aspect ratio of processing a contact, for example. Therefore, it is not practical to set small voxels. Accordingly, it is desirable to provide a new shape development calculation technique of a voxel model that is capable of precisely deriving an etching rate by reducing only the step of time period without reducing the voxel size.

Figure 19:
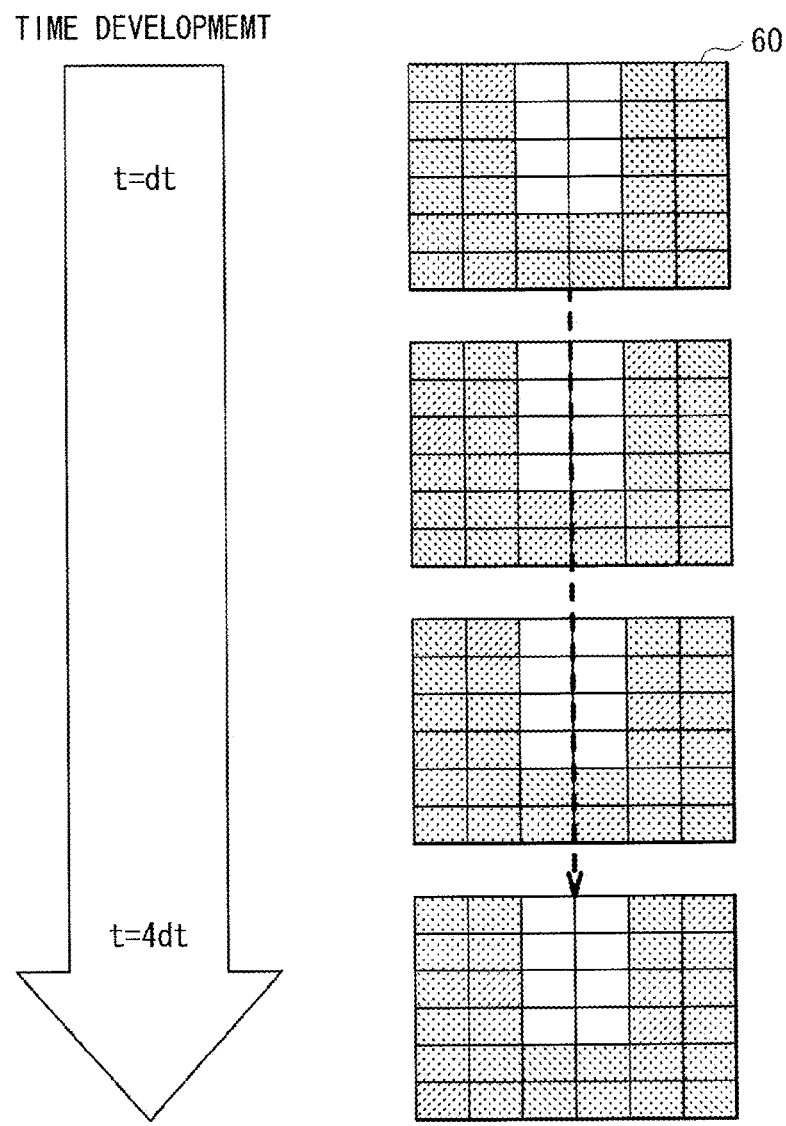
FIG. 19 is an explanatory diagram illustrating a concept of shape development by a simulation method according to a comparative example.
Figure 20:
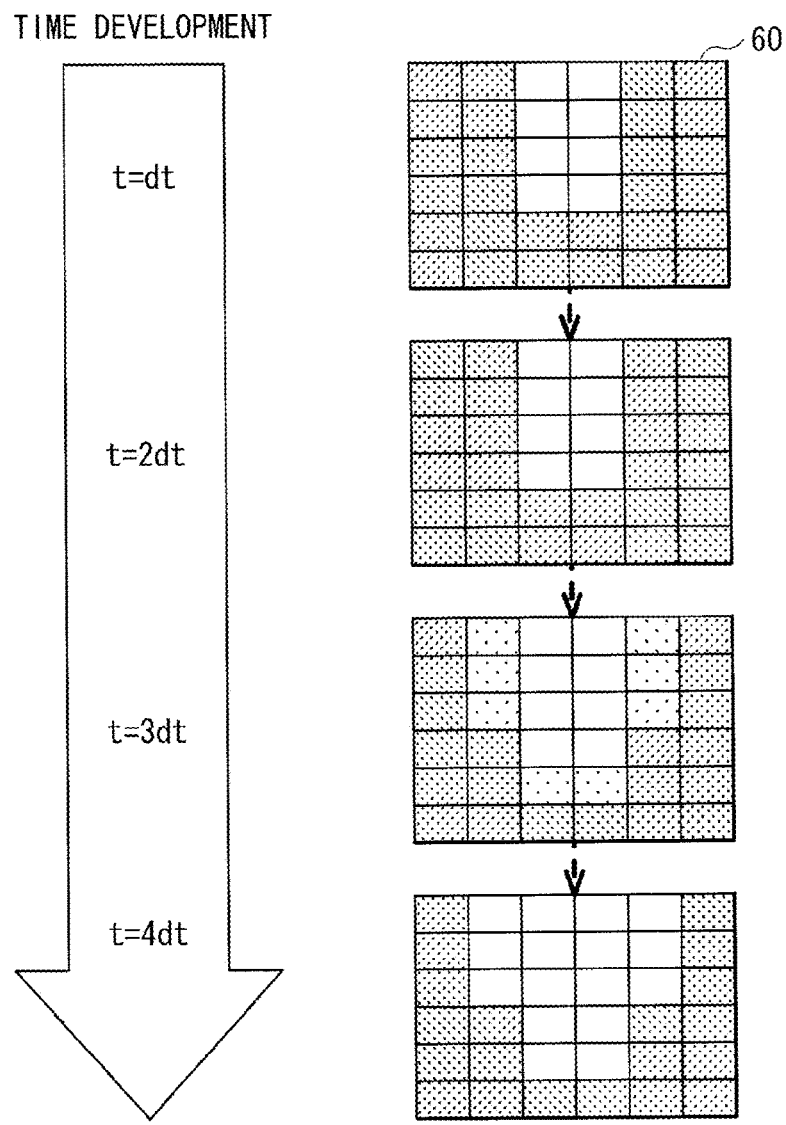
FIG. 20 is an explanatory diagram illustrating a concept of shape development by the simulation method according to the sixth embodiment.
Figure 21:
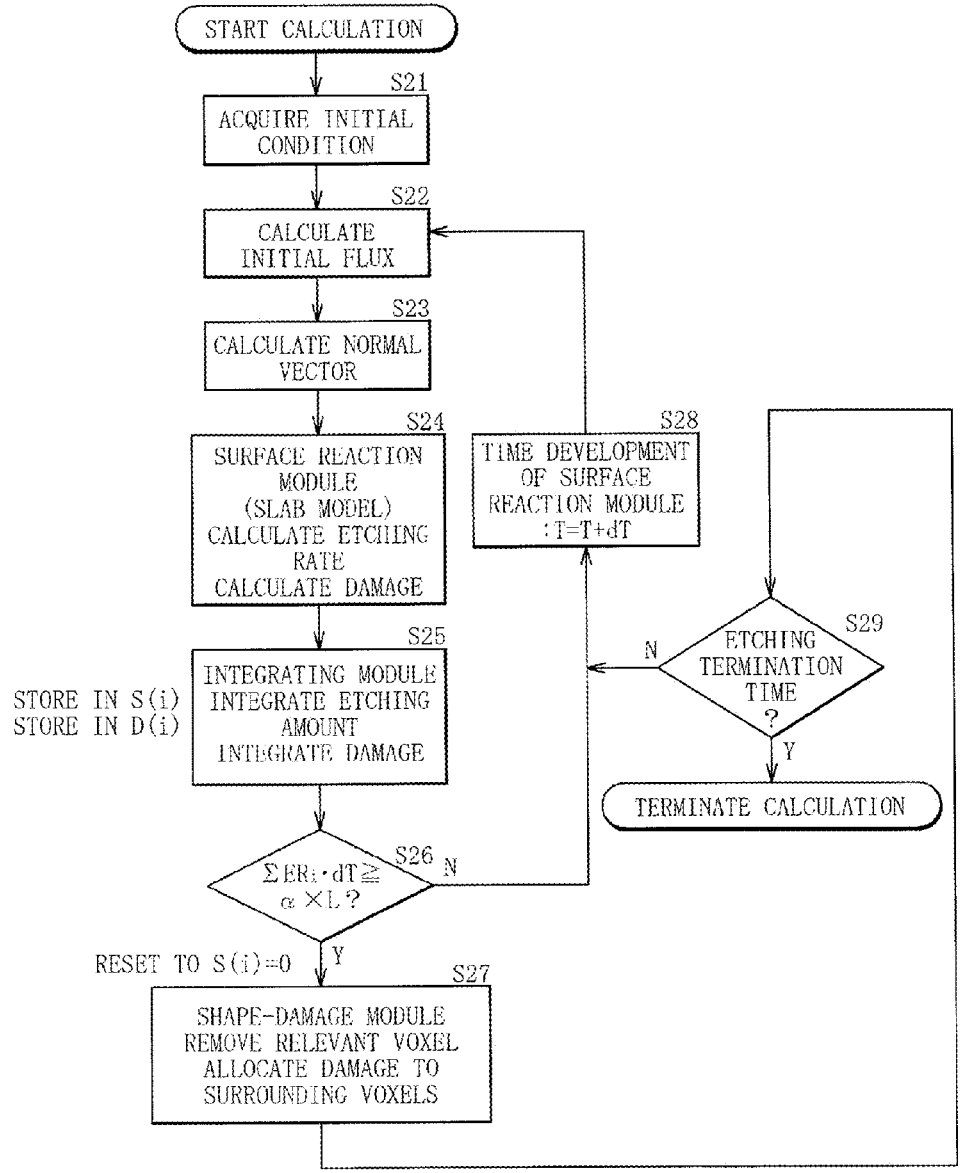
FIG. 21 is a flow chart illustrating an example of the simulation method according to the sixth embodiment.

The above-described issue is solved by a simulation method which will be described below. FIG. 21 illustrates an example of a simulation method according to the present embodiment. FIG. 19 illustrates a concept of shape development by a simulation method according to a comparative example. FIG. 20 illustrates a concept of shape development by the simulation method according to the present embodiment.

Figure 18:
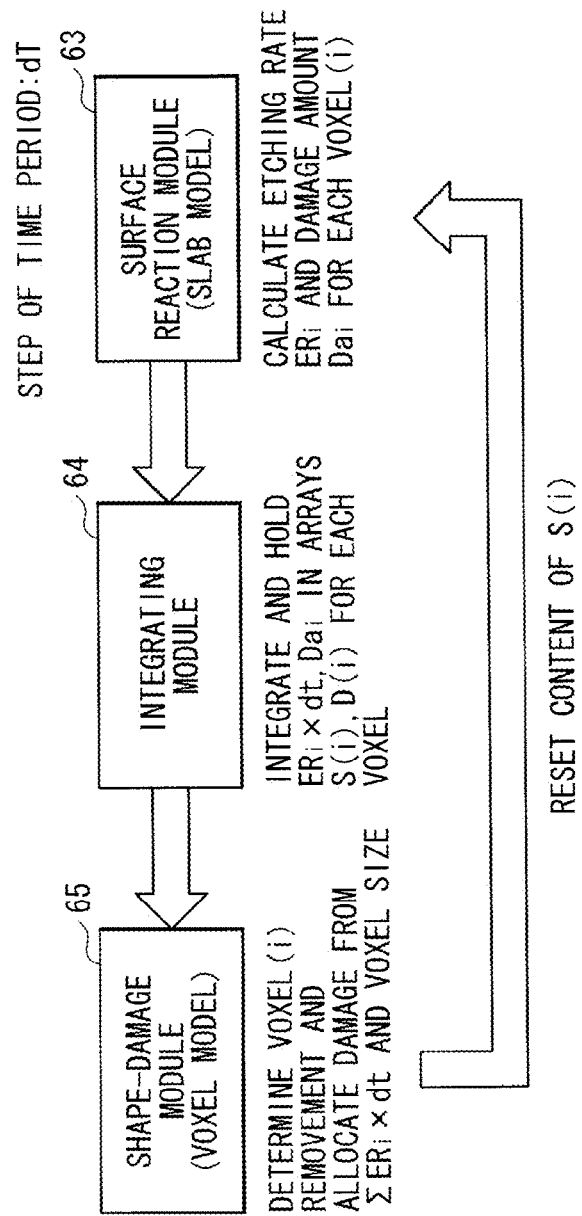
FIG. 18 is a block diagram illustrating a configuration example of a calculation section provided for achieving a simulation method according to a sixth embodiment.

FIG. 18 illustrates a configuration example of a calculation section in an information processing unit (simulator) provided for achieving the simulation method according to the present embodiment. A general configuration of the simulator according to the present embodiment is similar to the above-described general configuration shown in FIG. 2. However, the shape-damage calculation section 13 includes a surface reaction module 63, an integrating module 64, and a shape-damage module 65 as shown in FIG. 18.

The surface reaction module 63 calculates an etching rate $ER_i$ as the reaction rate and a damage amount $Da_i$ by solving a surface reaction model (slab model) that is established in consideration of the depth direction such as the above-described surface reaction model disclosed in Literature A. The shape-damage module 65 may perform shape development (removal of voxels) and damage allocation with respect to each voxel, for example, by a calculation technique based on a voxel model similar to that described above in the first embodiment. However, in the present embodiment, a local etching rate and a local damage amount in each step of time period derived by the surface reaction module 63 are not straightly transferred to the shape-damage module 65 but are once transferred to the integrating module 64, which integrates and holds the etching amount and the damage amount in a predetermined array when appropriate. The shape-damage module 65 executes shape development and damage allocation while the etching amount and the voxel size are continuously compared on a basis of the steps of time period in the surface reaction module 63.

The largest feature of the simulation method according to the present embodiment may be that the integrating module 64 includes the calculation portion that integrates and holds the etching amount and the damage amount when appropriate, and the surface reaction model in the surface reaction module 63 is not limited to that described above. Also, calculation such as the damage allocation method in the shape-damage module 65 is not limited to that described above. A surface reaction model and calculation such as a damage allocation method which will be described below are also mere examples.

Description will be further given below of details of the simulation method according to the present embodiment referring to FIGS. 19 to 21.

The calculation section 12 (FIG. 2) acquires initial conditions (such as a recipe condition, a unit condition, a pattern structure, and a parameter for calculation) through the input section 11 (step S21), and calculates an initial flux that enters the surface of the processing target 60 (step S22). Further, a normal vector on the processing surface is derived from incident fluxes based on the above-described calculation process (i) described in the above first embodiment (step S23).

The surface reaction module 63 calculates the etching rate $ER_i$ and the damage amount $Da_i$ of each voxel (i) on the surface with the use of small step of time period dT (for example, 0.01 s) (step S24). The surface reaction module 63 transfers $ER_i$, $Da_i$ and dT of each voxel (i) to the integrating module 64. The integrating module 64 integrates and holds the etching amount $ER_i \times dT$ and the damage amount $Da_i$ in an array S(i) and in an array D(i), respectively (step S25). The integrating module 64 transfers the integrated and held etching amount that is $\Sigma ER_i \times dT$ to the shape-damage module 65. When the transferred etching amount satisfies the following Expression 9, the shape-damage module 65 removes the corresponding voxel (i) and allocates the damage amount to the surrounding voxels (steps S26 and S27).

$$\sum_{}^{m}(ER_i \times dT) \geq \alpha \times L \qquad \text{(Expression 9)}$$

Here, $\alpha$ (>0) is a determination parameter (which may be set at the beginning of the calculation or may be set during the calculation), L is a size of one voxel, and m is a number of time steps which have passed. When the condition in Expression 9 is satisfied (step S26: Y) and the calculation in the shape-damage module 65 is executed, the content of the array S(i) is reset. When it becomes the etching termination time (step S29: Y), the calculation is terminated. When it has not been the etching termination time (step S29: N), the process is continued.

On the other hand, when the condition in Expression 9 is not satisfied (step S26: N), the reset process of the array S(i) and the calculation in the shape-damage module 65 are not performed, and it proceeds straightly to the next step of time period (T=T+dt) (step S28) to continue the integrating process.

As described above, in the simulation method of the present embodiment, the amounts of the shape development (etching amount $ER_i \times dT$) based on the etching rate $ER_i$ as the reaction rate and the damage amounts $Da_i$ for a plurality of steps of time period are integrated by the integrating module 64. Based on the integrated amount of the shape development ($\Sigma ER_i \times dT$), the shape development and the allocation of the damage are performed by the shape-damage module 65. By such a calculation method, the etching amounts are integrated within small steps of time period, and the voxels that become removable on the surface of the processing target 60 are sequentially removed (for example, t=3dt→4dt in FIG. 20). In this case, the step of time period is not limited. On the other hand, in the calculation model (FIG. 19) of the comparative example in which the integrating process is not performed, the voxel which should be removed may not be removed in some cases due to an issue of precision of the etching rate.

It is to be noted that, the calculation technique according to the present embodiment is not limited to etching and may be widely applicable to any processing process using plasma such as CVD and PVD. Detailed description will be given later of simulation software and a processing unit (having functions of visualizing simulation results and automatic feedback to process control) that include the above-described calculation technique.

[Effects]
By using the above-described simulation method according to the present embodiment, the following effects are obtained.

(1) A precise etching rate and precise damage calculated from the detailed surface reaction model are reflected to the voxel model, and therefore, the shape and damage development is achieved with higher precision.

(2) The in-situ process control that uses the shape-damage simulation of the voxel model is achieved with high precision (see 6-5. First Configuration Example of Processing Unit and 6-6. Second Configuration Example of Processing Unit which will be described later).

(3) Processing is allowed to be performed while confirming the shape and damage-distribution simulation result, and therefore, TAT in constructing the process conditions is expected to be shortened (see 6-5. First Configuration Example of Processing Unit which will be described later).

(4) The process correction value that is obtained by the highly-precise simulation prediction is fed back sequentially to the processing condition. Therefore, highly-precise processing, low damage processing, and improvement in yield are expected (see 6-6. Second Configuration Example of Processing Unit which will be described later).

Calculation Example

Next, description will be given of actual calculation examples in which the simulation method according to the present embodiment was used.

6-2. First Calculation Example

Shape-Damage Simulation of Contact Hole Etching

The present calculation example is a simulation that assumes two-dimensional contact hole etching of a $SiO_2$ film using a CPP dry etching unit. The resist mask had a hole diameter of 200 nm and a film thickness of 400 nm, a size L of a voxel was 3 nm, and the following etching process conditions were used.

(Etching Process Conditions)
type and flow rate of gas: $C_4F_8/O_2/Ar=11/8/400$ sccm
pressure: 30 mTorr
Vpp=1450V
wafer temperature: 30 degrees Celsius The step of time period of the surface reaction in the calculation was 0.01 s and $\alpha=1$. Further, a calculation flow in the present calculation example was as shown in FIG. 21 described above. In this example, an array for integrating etching amounts was S(i), an array for integrating damage amounts was D(i), and the time step was dT. At this time, using the above-described process conditions and gas flux data in a chamber that had been obtained by plasma monitoring using OES, QMS, and IRLAS, a normal vector was derived, for example, by the above-described calculation process (i) in the above-described first embodiment, with the use of flux vectors of ions ($CF^+$, $CF_3^+$, $CF_2^+$, $C_2F_4^+$, $F^+$, $Ar^+$) that entered voxels in sidewalls and in a hole processing bottom portion and with the use of flux vectors of radicals ($CF_2$, CF, F, $CF_3$, O). Using the normal vector and the amount of fluxes in the direction of the normal vector, the surface reaction model established in consideration of the depth direction was solved, and an etching rate and a damage amount at the time when the etching time was 160 s were calculated. It is to be noted that, although the above-described surface reaction model disclosed in Literature A was used as the surface reaction model established in consideration of the depth direction in the present calculation example, the surface reaction model to be used is not limited thereto as long as the etching rate and the damage amount are allowed to be calculated.

Figure 22:
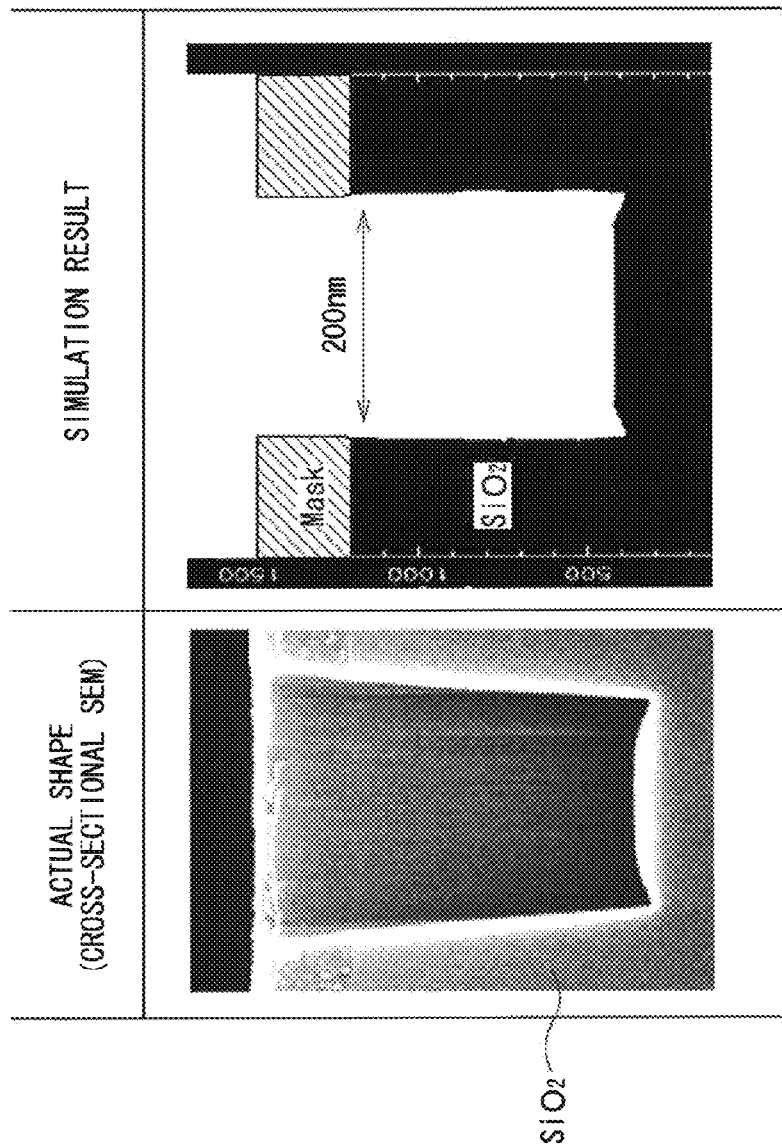
FIG. 22 is a cross-sectional view illustrating a first calculation example in which the simulation method according to the sixth embodiment was used.

The etching rate of a voxel in the center of the bottom region was 600 nm/min, and one voxel was removed by performing integration for thirty times by the integrating module 64 shown in FIG. 18. During this operation, the voxel in the sidewall was not removed due to formed polymer layer and due to the extremely-small etching rate. As shown in FIG. 22, the simulated hole shape reproduced an actual shape (cross-sectional SEM) using similar process conditions. Damage allocation was performed by the above-described calculation process (ii) in the above-described first embodiment.

It is to be noted that the process conditions, gas flux, and the type of a film to be processed that are applied to the simulation method according to the present embodiment are not limited to those described above, and may also be applicable to three-dimensional calculation.

6-3. Second Calculation Example

Etching in Vicinity of Interface Layer ($SiO_2$/Si)

Figure 23:
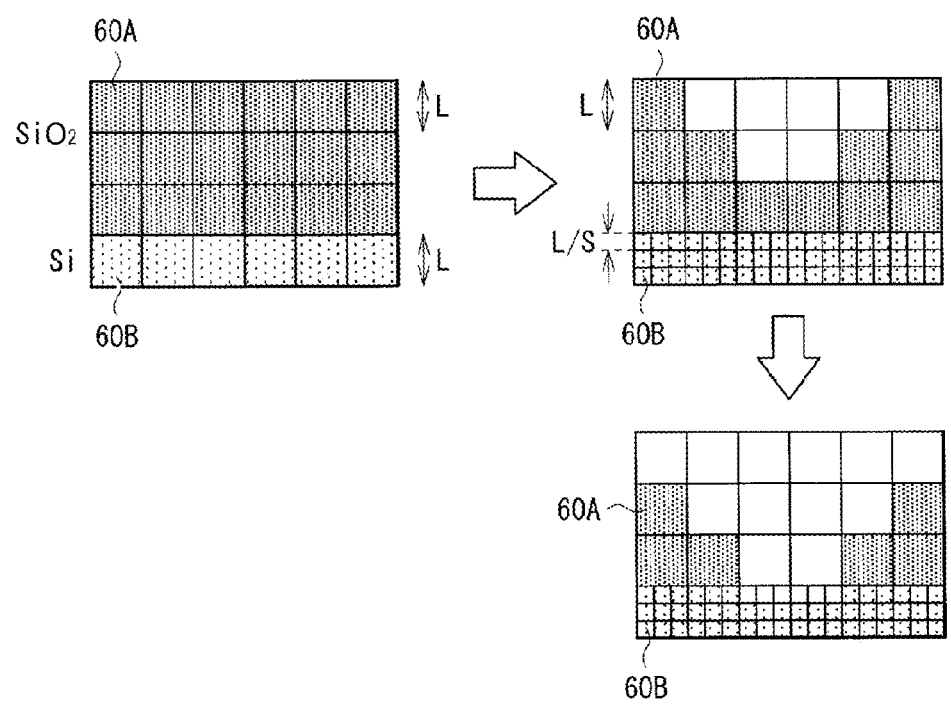
FIG. 23 is an explanatory diagram illustrating a second calculation example in which the simulation method according to the sixth embodiment was used.

The present calculation example is a calculation example of a case in which the processing target 60 was formed of a plurality of processing layers. As an example, here is shown a calculation example of a case in which the processing target 60 was formed of a first processing layer 60A and a second processing layer 60B as shown in FIG. 23. In such a case in which the processing target 60 was formed of a plurality of processing layers, a voxel size was varied in a region (in the vicinity of the interface layer) in which the shape development was considered to occur over two or more processing layers. It is to be noted that, although description will be given below of a calculation example of a case in which the above-described integrating process by the integrating module 64 was performed in all of the processing layers, the integrating process may be performed only on part of the layers. For example, usual shape development may be performed not using the integrated amounts of shape development but using an amount of shape development corresponding to a predetermined time step in a region in which the shape development is considered to occur in a single processing layer, and the shape development may be performed based on the integrated amounts of shape development in the region (in the vicinity of the interface layer) in which the shape development is considered to occur over two or more processing layers.

Figure 24:
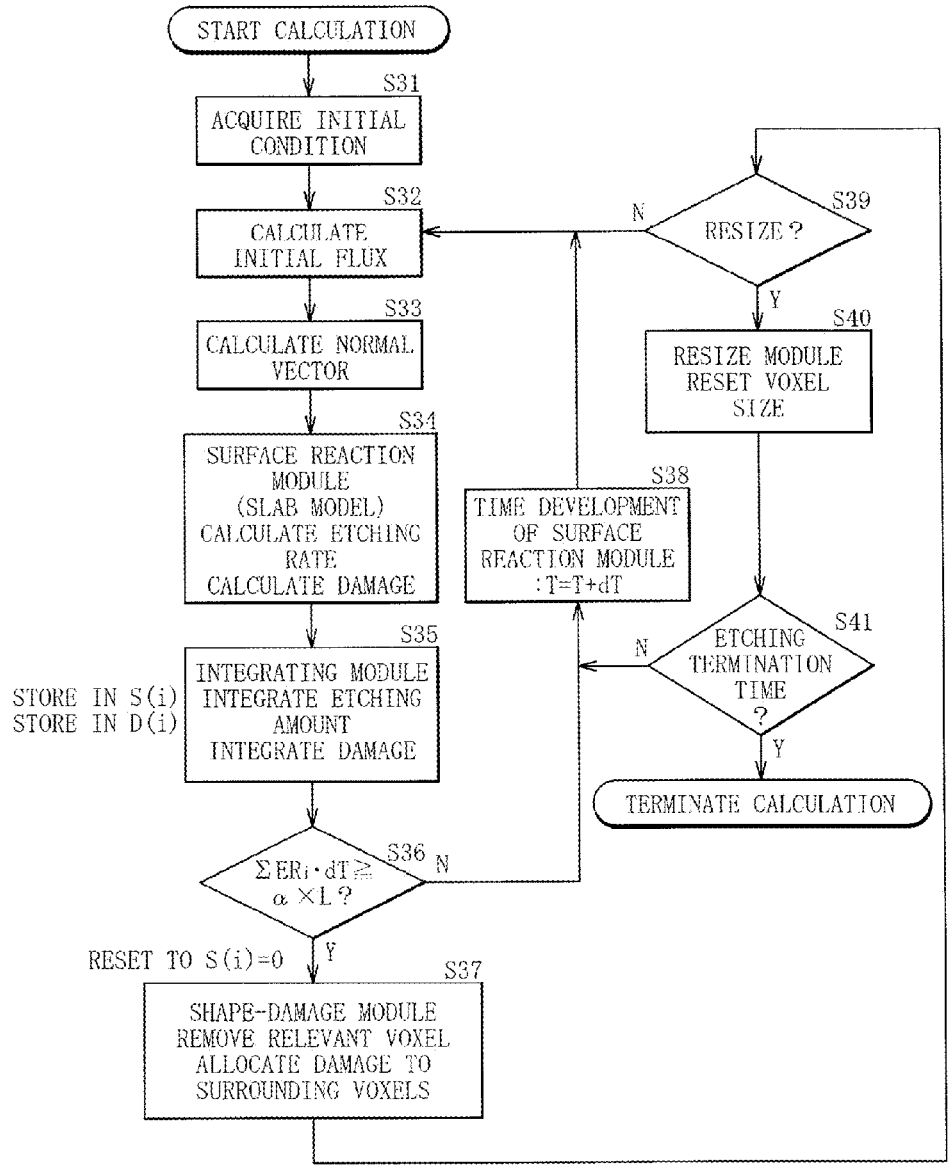
FIG. 24 is a flow chart illustrating another example of the simulation method according to the sixth embodiment.

FIG. 24 illustrates a calculation flow of the present calculation example. Processes in steps S31 to S38 in FIG. 24 are similar to the above-described processes in the steps S21 to S28 in FIG. 21. In the present calculation example, the calculation section 12 (FIG. 2) included a process of determining resizing of voxels (step S39) and a process of resetting a voxel size by a resize module (step S40). The calculation section 12 continued the process without changing the voxel size when the calculation section 12 had not determined to resize the voxel size. When the calculation section 12 determined to resize the voxel size, the resize module reset the voxel size (step S40), and the calculation was terminated when it became the etching termination time (step S41: Y). When it had not been the etching termination time (step S41: N), it moved to the next step of time period (T=T+dt) (step S38) and the process was continued.

A specific example of resizing the voxel will be described below. FIG. 23 is simulation that assumed etching of a laminated film of $SiO_2$/Si using a CCP dry etching unit. The voxel size L in the $SiO_2$ layer and the Si layer was 3 nm. Further, the following etching process conditions were used.

(Etching Process Conditions)
type and flow rate of gas: $C_4F_8/O_2/Ar$=6/8/400 sccm
pressure: 30 mTorr
Vpp=1450V
wafer temperature: 30 degrees Celsius When the etching of $SiO_2$ proceeded and the number of voxel that existed under the voxel having a highest etching rate became one, the calculation section 12 determined to resize the voxel size (step 39: Y in FIG. 24) and the resize module reduced the voxel size in the Si layer (FIG. 23). At this time, a $SiO_2$/Si selection ratio S in the relevant voxel was calculated by the surface reaction calculation, and the voxel size was reset to a value obtained by dividing L by the selection ratio S. In the present calculation example, the selection ratio S was 3, and therefore, the size of the voxel was set to 1 nm that was ⅓ of the size of the voxel in $SiO_2$. Under the circumstance in which the foregoing resizing process was performed, simulation was performed by the calculation technique shown in FIG. 24.

It is to be noted that, although the voxel having the highest etching rate was used as a determination reference for resizing the voxel size, the determination reference is not limited thereto. Moreover, resizing is not limited to a square shape and a cubic shape.

6-4. Configuration Example of Simulation Software

Program

The simulation method of the present embodiment may be applicable, for example, to the above-described simulation software (FIG. 15) according to the third embodiment.

Specifically, the shape-damage calculation section 27 in FIG. 15 performs the calculation of shape and damage distribution according to the calculation flow shown in FIG. 21 or FIG. 24. After terminating the calculation, results of the position information (processing shape information such as line width, taper, and a mask residual film) of the voxel, damage distribution, and film thickness of reaction sediments (polymers and oxides) are outputted from the output section 28 to a file. Further, these results may be also visualized by the GUI 29. The data may be outputted or visualized during the calculation in real time.

6-5. First Configuration Example of Processing Unit

The simulation method of the present embodiment may be applicable, for example, to the above-described processing unit (FIG. 16) according to the fourth embodiment.

Specifically, the shape-damage calculation section 45 in FIG. 16 takes into consideration the contribution to the flux of the wafer opening ratio and the semi-local opening ratio (in-chip opening ratio) (that are in a linear relation) calculated by the opening ratio calculation section 44 with the use of the GDS and film-thickness information 41 and performs the calculation according to the calculation flow shown in FIG. 21 or FIG. 24. The foregoing process is sequentially repeated during the processing, and the actual processing is allowed to be performed while confirming prediction of the shape variation and the damage distribution in real time by the visualization system using the GUI 37.

6-6. Second Configuration Example of Processing Unit

The simulation method of the present embodiment may be applicable, for example, to the above-described processing unit (FIG. 17) according to the fifth embodiment.

Specifically, the simulation system 51 in FIG. 17 calculates the shape development and the damage distribution according to the calculation flow shown in FIG. 21 or FIG. 24.

The optimization calculation system 52 takes into consideration the contribution to the flux of the wafer opening ratio and the semi-local opening ratio (in-chip opening ratio) (that are in a linear relation) calculated by the opening ratio calculation section 44 with the use of the GDS and film-thickness information 41, and calculates the etching rate and the damage distribution by the calculation flow shown in FIG. 21 or FIG. 24.

When the shape and the damage are out of the desirable spec (for example, when a variation value of line width may be ±10% or more of a desirable value of 70 nm and a damage amount may be increased by 50% of a desirable value of $10^{11}/cm^2$), the process parameters may be varied in order of a gas flow rate, gas pressure, application power, and wafer temperature, for example, by ±50% (this determination condition value is parameterized), and the calculation in FIG. 21 or FIG. 24 may be performed. Thus, correction conditions that achieve shape and damage within the desirable spec are found. The correction conditions are transferred to the control system 38 thorough the correction process condition output section 55. The control system 38 transmits a control signal so that the processing chamber 32 satisfies the correction conditions. The processing chamber 32 changes the parameters relevant to the correction conditions and continues the processing. If a solution that satisfies the spec is not found in the simulation, an alert signal is transmitted to the FDC/EES system 39 and the unit is stopped thereby.

7. Seventh Embodiment

Next, description will be given of a display unit according to a seventh embodiment of the present disclosure. It is to be noted that description similar to that of the above first to sixth embodiments will be appropriately omitted.

7-1. Fourth Example of Simulation Method

Figure 25:
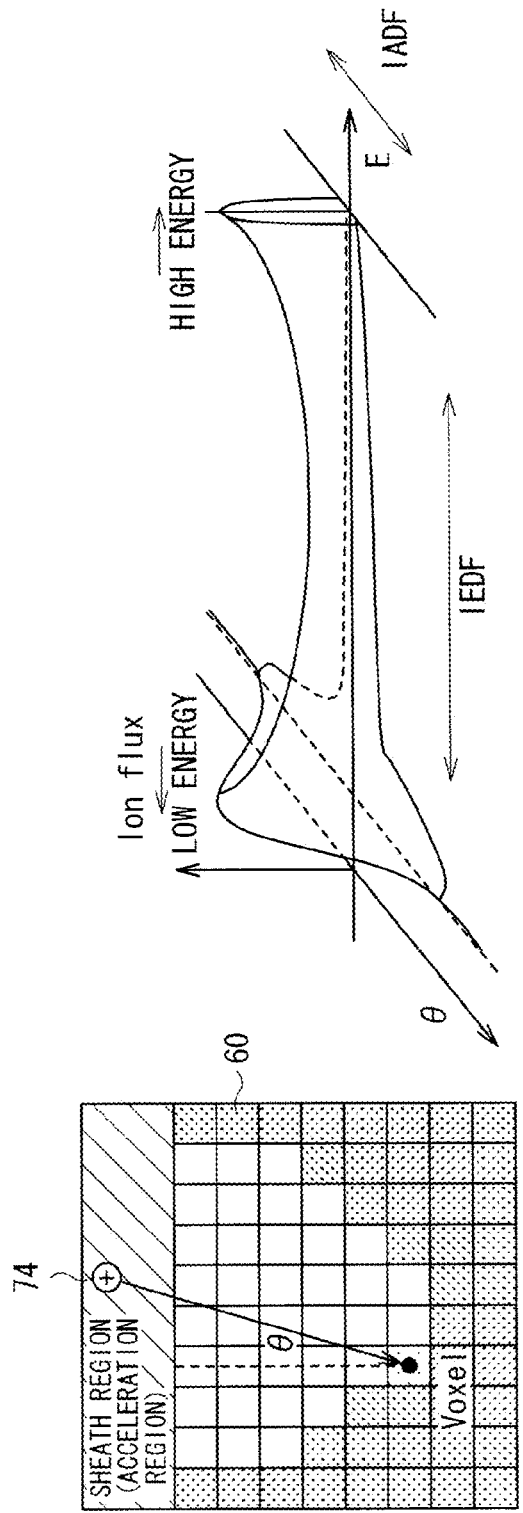
FIG. 25 is an explanatory diagram illustrating an ion energy distribution function and an ion angular distribution function.

Example of Calculation Method Taking into Consideration Variation in IEDF and IADE In general, in a shape simulation of semiconductor processing, an etching rate is calculated by solving a surface reaction with the use of incident fluxes to patterns of ions and radicals that are generated by plasma. Therefore, highly-precise etching rate calculation technology may be necessary for highly-precise shape prediction. At that time, it may be a key how to model and incorporate into the calculation an ion energy distribution function (IEDF) and an ion angular distribution function (IADF) of incident ions with high speed and high precision. FIG. 25 illustrates an example of the IEDF and the IADF of an ion 74 that enters the surface of the processing target 60. When the ion 74 passes through a sheath region (a region to which a high-frequency electric field is applied), the ion 74 enters a processing pattern while repeatedly colliding with the radical particles around and repeatedly being accelerated by the applied bias. At this time, immediately after the ion 74 passes through the sheath region, it is known that an ion flux has a three-dimensional space distribution of energy and angle as shown in FIG. 25.

A high-energy component of the ion flux has narrow incident angular distribution, and therefore, is a component that mainly contributes to a bottom portion of the shape. A low-energy component has wide incident angular distribution, and therefore, contributes to a sidewall portion of the shape. Therefore, upon predicting the processing shape and the damage distribution due to the ion 74 with high precision, it may be favorable to consider the IEDF and the IADF, and to further consider variations in the IEDF and the IADF during the processing.

Concerning modeling of the IEDF and the IADE used for the surface reaction, there is a technology disclosed in Literature B (Japanese Unexamined Patent Application Publication No. 2004-266098), for example. In the technology disclosed in Literature B, first, energy integration related to the IEDF is firstly performed at the beginning of shape calculation (a model that ignores reduction in incident ion energy according to increase in a deposition film formed on the processing surface during the processing), and a function only of an angle θ that includes an expected pattern frontage is set. The calculation of the etching rate is executed in consideration of the variation in the incident angular distribution resulting from variation in the shape according to the progress of the processing, that is, variation in θ. Thus, high speed in the calculation is achieved.

However, the above-described technology disclosed in Literature B is a technique that uses the ion fluxes that are subjected to energy integration at the beginning of the calculation. Therefore, the technology disclosed in Literature B is not favorable for being applied, for example, to processing of a high aspect ratio pattern in which an incident gas flux largely varies during the processing or to a processing process in which the thickness of the deposition film (a polymer or an oxide) formed on the surface varies during etching. One reason for this is that the etching rate may be overestimated and precision of the shape prediction may be largely lowered in some cases.

Moreover, when an ion intrudes into the deposition film on the processing surface, or further, into an reaction layer therebelow, energy of ions as much as several hundred eV is lost due to scattering by surrounding atoms. According to such variation in the depth direction of the IEDF, the IADF also may be varied largely. However, the above-described technology disclosed in Literature B also ignores the effect, and therefore, there is an issue that precise prediction of etching rate, and further, precise shape prediction are difficult.

Due to miniaturization of a pattern according to recent improvement in device function, for example, reduction in damage caused on a substrate, a processing shape prediction technology that is accurate in nanometer level, etc. has been necessary. Accordingly, a three-dimensional shape-damage simulation technology has been attracted attention. Under such a circumstance, a calculation technology of predicting shape and damage with high speed and high precision while taking into consideration variation in both the IEDF and the IADF where appropriate during the processing has been desired.

Figure 26:
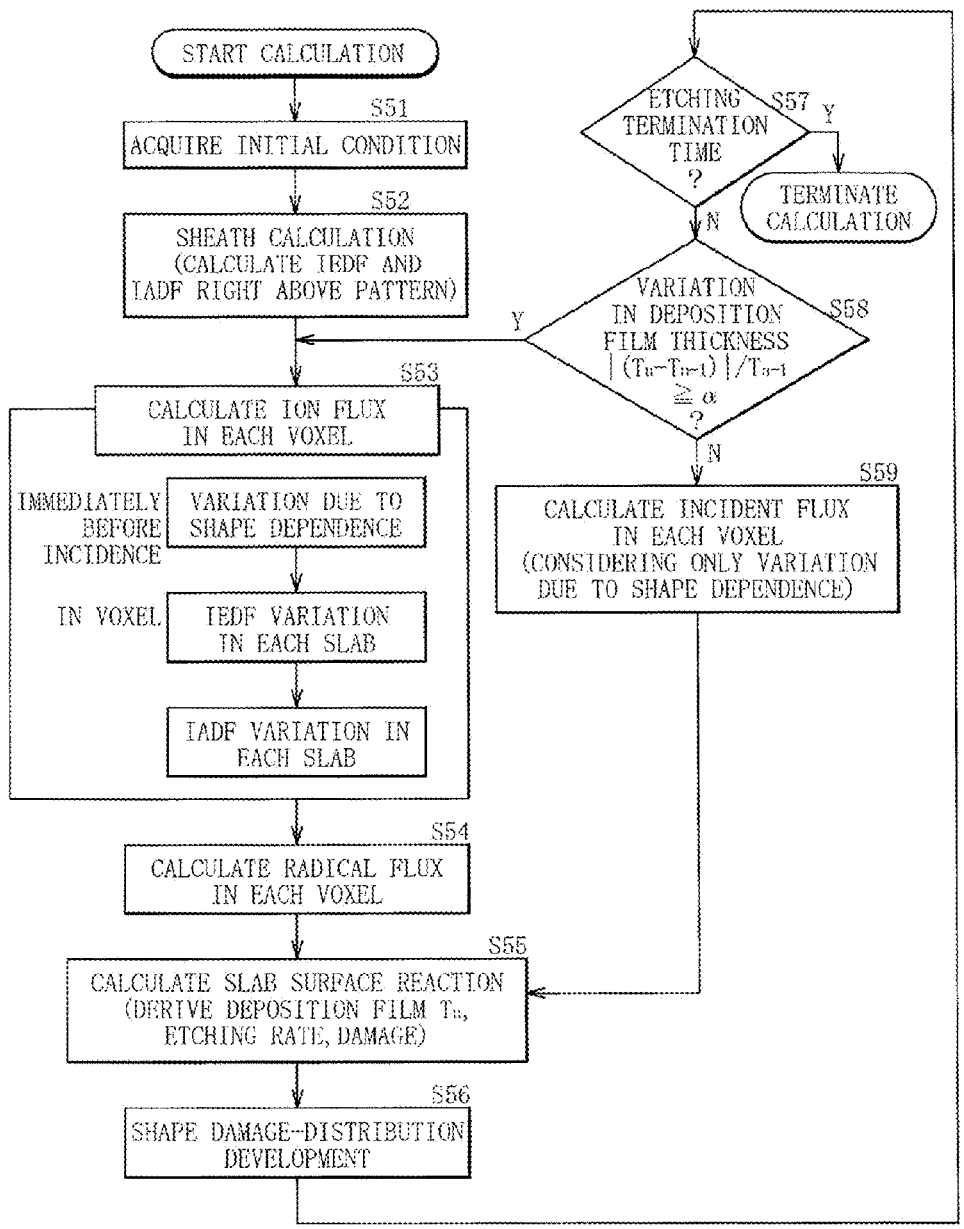
FIG. 26 is a flow chart illustrating an example of a simulation method according to a seventh embodiment.

The above-described issue is solved by a simulation method which will be described below. FIG. 26 illustrates an example of a simulation method according to the present embodiment. It is to be noted that a general configuration of an information processing unit (simulator) for achieving the simulation method according to the present embodiment is similar to that described in FIG. 2, and the shape-damage calculation section 13 performs calculation shown in a calculation flow in FIG. 26.

In the present embodiment, upon calculating the shape development by the shape-damage calculation section 13, for example, a voxel model similar to that of the above-described first embodiment may be used. However, other models such as the string model and the level-set model may be used. As the surface reaction model, for example, a surface reaction model (slab model) that is established in consideration of the depth direction such as the above-described surface reaction model described in Literature A may be used.

Figure 27:
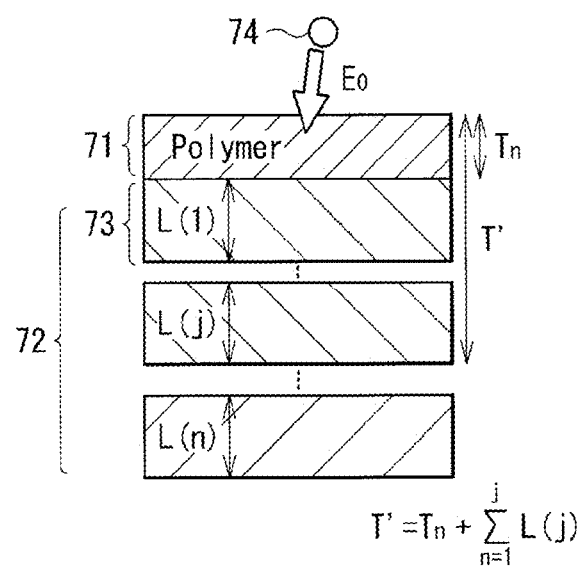
FIG. 27 is a cross-sectional view illustrating an example of a slab model.

FIG. 27 illustrates an example of the slab model. In the slab model, a region of a reaction layer 72 is divided, in the depth direction, into a plurality of thin slabs 73, and a surface reaction of each slab 73 is solved. In the slab model shown in FIG. 27, the reaction layer 72 is formed below a deposition film 71. For example, in a case where a $SiO_2$ film as the processing target is dry-etched, when, for example, CF-based gas is used as etching gas, a polymer layer that includes carbon (C) in a surface of the $SiO_2$ film is formed as the deposition film 71. As shown in FIG. 27, when thickness of the deposition film 71 is Tn, thickness T' from a surface of the deposition film 71 to a lower layer of the jth slab 73 is Tn+L(1)+L(2)+ ... L(j). L(j) is thickness of the jth slab 73.

The simulation method according to the present embodiment includes a process (step S53 in FIG. 26) of calculating the variation in the IEDF and the variation in the IADF at the time when the ion 74 passes through the deposition film 71 formed on the surface of the processing target and through the reaction layer 72 formed below the deposition film 71. The simulation method according to the present embodiment also includes a process of calculating the ion flux while taking into consideration the variation in the IEDF and the variation in the IADF at the time when the ion 74 passes through the deposition film 71 and the reaction layer 72. The simulation method according to the present embodiment also includes a process (step S55 in FIG. 26) of calculating a reaction rate of a predetermined processing by solving a predetermined surface reaction model and a process (step S56 in FIG. 26) of calculating the shape development of the processing target based on the reaction rate. The simulation method according to the present embodiment also includes a process (step S58 in FIG. 26) of calculating variation in the thickness Tn of the deposition film resulting from the shape development, and a process of recalculating the variation in the IEDF and the variation in the IADF using the variation in the film thickness Tn of the deposition film as an index.

Description will be given below in detail of the simulation method according to the present embodiment according to the calculation flow in FIG. 26. It is to be noted that the largest feature of the simulation method according to the present embodiment is that the simulation method included a process of calculating the incident flux taking into consideration the variation in the ion energy distribution function and the variation in the ion angular distribution function. Calculation such as the allocation method of damage is not limited to that described above in the first embodiment.

The shape-damage calculation section 13 (FIG. 2) acquires the initial conditions (the recipe condition, the unit condition, the pattern structure, and the parameter for calculation) through the input section 11 (step S51). After acquiring the initial conditions, database of the IEDF and the IADF of the ion 74 immediately after the ion 74 has passed through the sheath region is made by sheath calculation or actual measurement (step S52). Alternatively, a function $f(\theta, E)$ of the IEDF and the IADF is made. In this example, $\theta$ is an estimated angle from a relevant voxel to a pattern frontage, and E is energy of the ion 74.

Next, an incident ion flux in each voxel that exists on the processing surface is calculated (step S53). At that time, variation due to shape dependence ($\theta$ dependence), the variation in the IEDF in each slab, and the variation in the IADF in each slab are calculated. Further, a radical flux in each voxel is calculated (step S54). Based on the foregoing information, slab surface reaction calculation is performed (step S55). As the slab surface reaction calculation, for example, an etching rate as the reaction rate, a damage amount, etc. may be calculated. When it comes to the etching termination time (step S57: Y), the calculation is terminated.

When it has not come to the etching termination time (step S57: N), updates in the IEDF and in the IADF are determined based on a condition in the following Expression 10, using the film thickness Tn (n: number of time step) of the deposition film as a parameter (step S58). Here, $\alpha$ is a determination condition and may be, for example, 0.2 (it goes without saying that a value of $\alpha$ is not limited to 0.2 according to the calculation application). If Expression 10 is satisfied (step S58: Y), the variation in the IEDF and the variation in the IADF are updated, and if Expression 10 is not satisfied (step S58: N), update is not performed and the slab surface reaction calculation is performed in consideration only of the variation due to the shape dependence (steps S59 and S55). The calculation described above is repeated until the step of time period corresponds to the etching time.

$$\left|\frac{T_n - T_{n-1}}{T_{n-1}}\right| \geq \alpha \qquad \text{(Expression 10)}$$

Next, description will be given of a technique of calculating the variation in the IEDF and the variation in the IADF in the slab.

[Calculation of Variation in IEDF]

Figure 28:
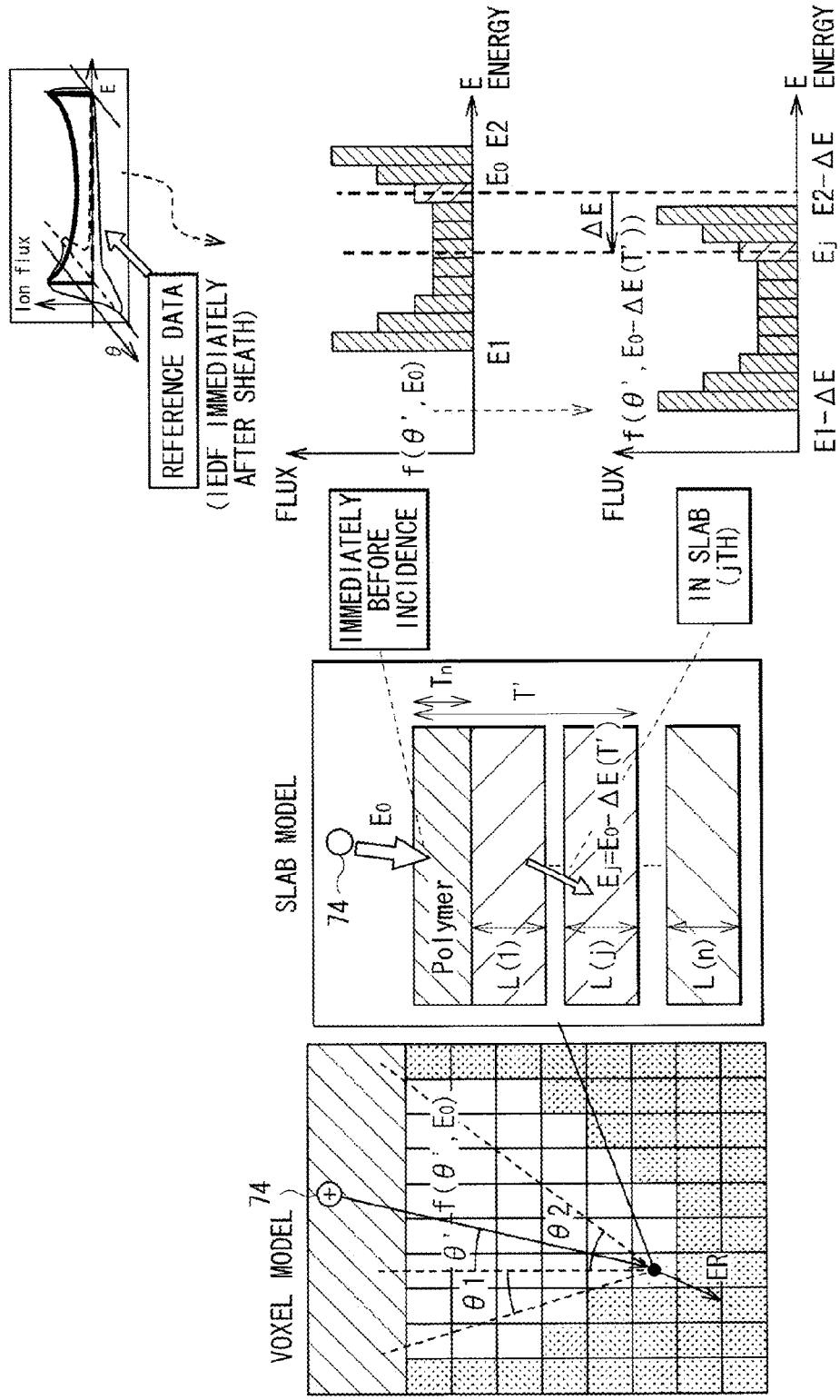
FIG. 28 is an explanatory diagram illustrating a concept of variation in ion energy distribution function.

The variation in the IEDF is calculated as follows in consideration of reduction in ion energy at the time when the ion passes through the deposition film 71 and the reaction layer 72. FIG. 28 illustrates a concept of the technique of calculating the variation in the IEDF. As shown in FIG. 28, the energy E of the ion 74 itself is reduced by $\Delta E(T')$ depending on the thickness (Tn) of the deposition film and the total thickness ($\Sigma L(j)$) of the slabs below the deposition film. At this time, a flux value of the relevant energy is read or a function value is read as shown in Expression 11 from the reference data base of the IEDF immediately after the ion 74 has passed through the sheath region.

$$f(\theta', E_0) \Rightarrow f(\theta', E_0 - \Delta E(T')), \qquad \text{(Expression 11)}$$

$$T' = T_n + \sum_{n=1}^{j} L(j)$$

[Calculation of Variation in IADF]

As described above, the variation in the IADF is calculated so that a total amount of the incident ion fluxes in a first angle range of the IADF immediately before the ion 74 enters the deposition film 71 is equal to a total amount of the incident ion fluxes in a second angle range of the IADF at the time when the ion 74 passes through the reaction layer 72.

Figure 29:
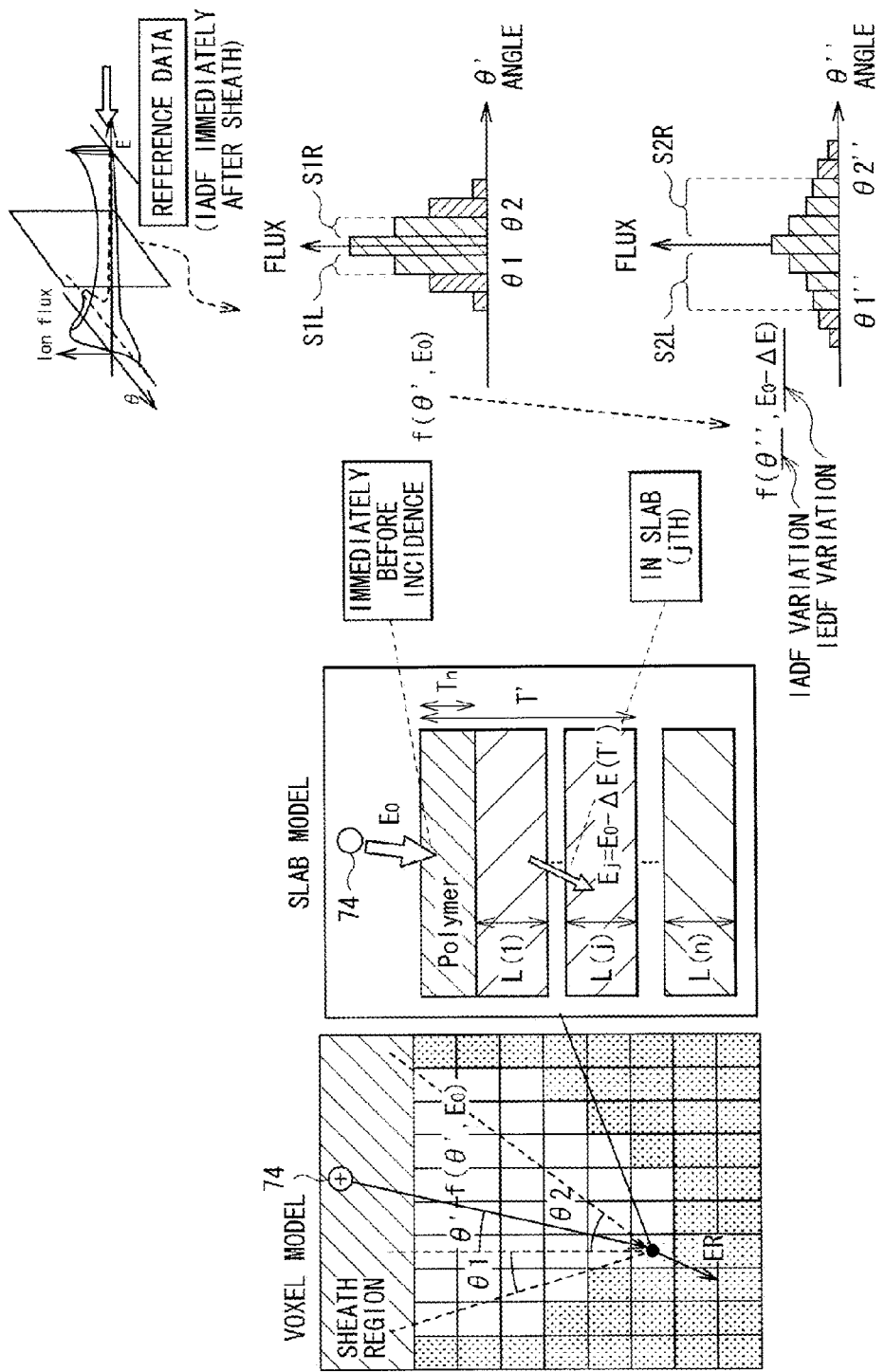
FIG. 29 is an explanatory diagram illustrating a concept of variation in ion angular distribution function.

FIG. 29 illustrates a concept of a technique of calculating the variation in the IADF. The first angle range of the IADF immediately before the incidence is defined by expected angles $\theta1$ and $\theta2$ from any voxel that exists on the processing surface. Upon determining the IADF in the jth slab 73, first, a function value is acquired as shown in Expression 11. Next, a new second angle range [0, $\theta1''$], [0, $\theta2''$] is determined (Expression 14) so that an area surrounded by the second angle range is equal to an area (S1L, S1R) surrounded by the above-described first angle range and so that a ratio between an area in the right direction and an area in the left direction in angle with respect to the vertical direction of the area surrounded by the second angle range is equal to that of the area surrounded by the first angle range (Expression 13). S2R is an area in the right direction that is surrounded by the second angle range and S2L is an area in the left direction that is surrounded by the second angle range.

$$S1L+S1R=S2L+S2R \quad \text{(Expression 12)}$$

$$S1L/S1R=S2L/S2R \quad \text{(Expression 13)}$$

$$f(\theta',E_0) \Rightarrow f(\theta'',E_0-\Delta E(T)) \quad \text{(Expression 14)}$$

In such a manner, the variation in the IEDF and in the IADF of the ion 74 in the processed film is allowed to be calculated analytically with high speed not using the Monte Carlo method.

In the calculation technique of the present embodiment, it is assumed that the information immediately after the ion has passed through the sheath region lingers in the IEDF and the IADF in the processed film. In other words, it is assumed that a scattering mechanism in the sheath region and the scattering mechanism in the processed film are the same. One reason for this may be as follows. That is, in the sheath region, the ion 74 has the scattering mechanism in which the ion 74 is repeatedly collided with the radicals around the ion 74 while obtaining energy of an applied bias. However, considering that the applied bias has an extremely-small limit, the collision becomes dominant, and it may be considered that the scattering of the ion 74 in the sheath region is allowed to be approximated to the scattering of the ion 74 in the processed film. Moreover, it may be estimated that the number of scattering of the ion 74 in the sheath region (having a thickness of several millimeters) is almost equivalent to the number of scattering of the ion 74 in the processed film (having a thickness of several nanometers) during a typical processing process.

Detailed description will be given later of simulation software and a processing unit (having functions such as visualizing simulation results and automatic feedback to process control) that is provided with the above-described calculation technique.

[Effects]

By using the above-described simulation method according to the present embodiment, the following effects are obtained.

(1) Unlike the process based on the usual Monte Carlo method, the simulation method according to the present embodiment is an analytic technique of calculating the variation in the IEDF and in the IADF. Therefore, high-speed calculation of shape-damage development is achievable (simplification of the calculation is achievable).

(2) By using the simulation method according to the present embodiment in combination with the above-described calculation technique of the first embodiment, in-situ process control using the shape-damage simulation of the voxel model is achieved with high precision (see 7-5. First Configuration Example of Processing Unit and 7-6. Second Configuration Example of Processing Unit which will be described later).

(3) Processing is allowed to be performed while confirming the shape and damage-distribution simulation result, and therefore, TAT in constructing the process conditions is expected to be shortened (see 7-5. First Configuration Example of Processing Unit which will be described later).

(4) The process correction value that is obtained by the highly-precise simulation prediction is fed back sequentially to the processing condition. Therefore, highly-precise processing, low damage processing, and improvement in yield are expected (see 7-6. Second Configuration Example of Processing Unit which will be described later).

Calculation Example

Next, description will be given of actual calculation examples in which the simulation method according to the present embodiment was used.

7-2. First Calculation Example

Calculation of Variation in IEDF and IADF Upon Etching SiO$_2$ Flat Film

The present calculation example is simulation that assumed etching of a SiO$_2$ flat film with the use of a CCP dry etching unit. In the calculation, the following etching process conditions, the following unit conditions, and the following plasma conditions were used.

Figure 30:
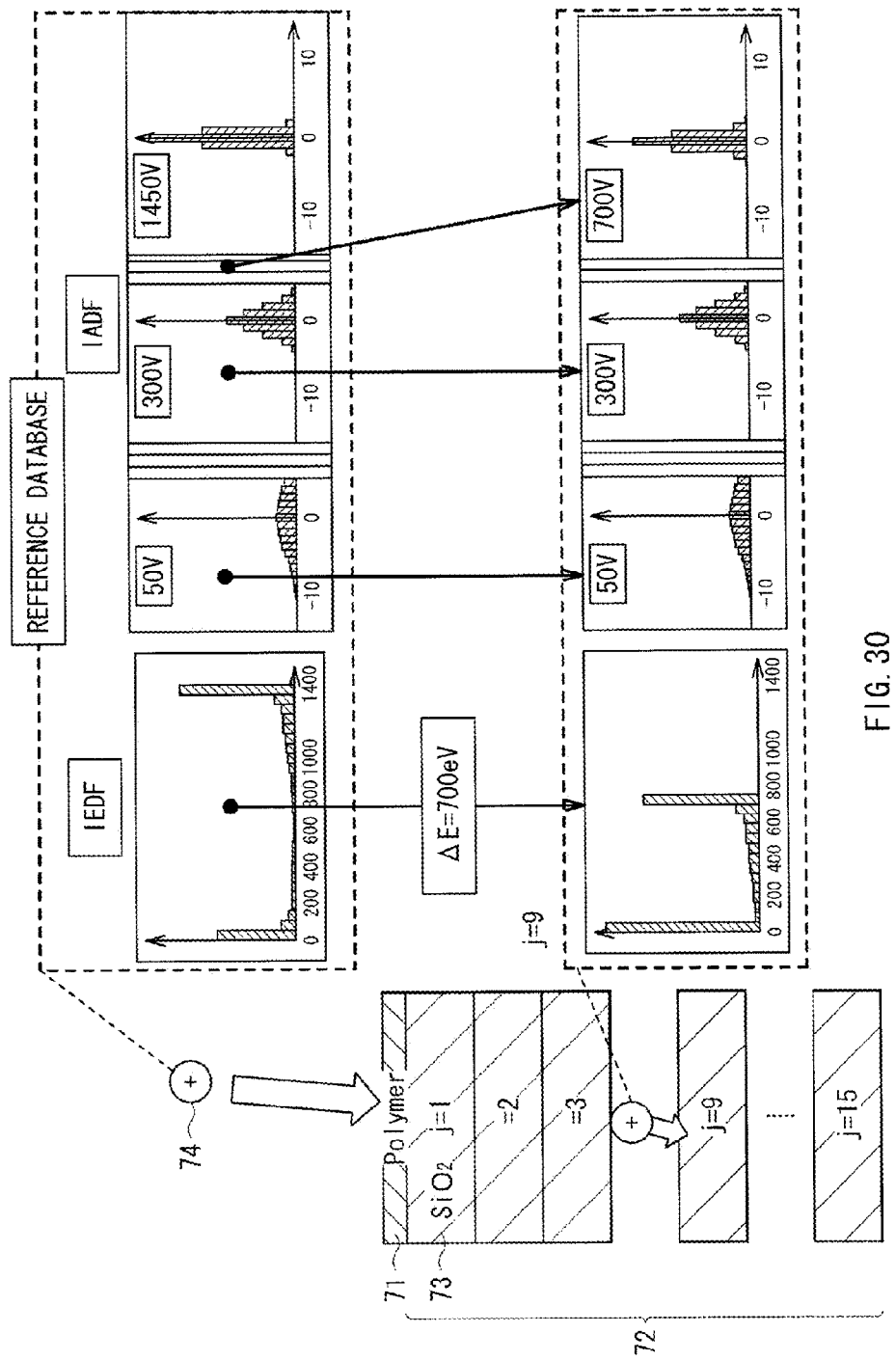
FIG. 30 is an explanatory diagram illustrating a first calculation example in which the simulation method according to the seventh embodiment was used.

(Etching Process Conditions)
type and flow rate of gas: C$_4$F$_8$/O$_2$/Ar=11/8/400 sccm
pressure: 30 mTorr
wafer temperature: 30 degrees Celsius
(Unit Conditions and Plasma Conditions)
upper application frequency: 60 MHz
lower application frequency: 2 MHz
lower application bias: 700 V
plasma potential: 20V
self-bias voltage: −700 V
plasma density: 5×10$^{10}$/cm$^3$
electron temperature: 3 eV Using the above-described conditions, reference database of the IEDF and the IADF was made by sheath calculation that takes into consideration sheath oscillation and radical scattering in the sheath region. The database of the IADF was made for every 50 eV of energy and a bin width of the angle was 1 degree (an upper-right part of FIG. 30 illustrates a part of the database). It is to be noted that the above-described surface reaction model (slab model) established in consideration of the depth direction disclosed in Literature A was used for the surface reaction calculation. The step of time period of the surface reaction was set as 0.01 s, the thickness of one slab 73 was set as 0.5 nm, and the number of slab was set as 15.

FIG. 30 illustrates a state of the etching when the reaction reached a steady state. The deposition film 71 (polymer layer) that was formed on the SiO$_2$ film at that time was 0.1 nm thick. The ion 74 entered the deposition film 71 and traveled being scattered in the SiO$_2$ film of each slab 73. However, for example, on a surface of the 9th slab (j=9), for example, energy attenuation of 700 V occurred in a CF$_2$$^+$ ion, and the variation in the IEDF and in the IADF at that time was calculated as shown in a lower-right part of FIG. 30. A result of calculating the etching rate using the IEDF and the IADF of each ion (CF$^+$, CF$_3$$^+$, CF$_2$$^+$, C$_2$F$_4$$^+$, F$^+$, Ar$^+$) in each slab 73 and fluxes of radicals (CF$_2$, CF, F, CF$_3$, and O) was 540 nm/min, which was equivalent to a value obtained in the actual measurement. It is to be noted that, although data obtained by plasma monitoring in a chamber using OES, QMS, and IRLAS was used as the value of the incident flux, a flux value calculated by plasma simulation may be alternatively used.

Moreover, the reference database of the IEDF and the IADF of the incident ion 74 was made by performing the sheath calculation with the use of the Monte Carlo method in advance in the above-described example. However, a function (depending on ion energy and incident angle) that is derived from analytical solution such as Maxwell distribution

7-3. Second Calculation Example

Shape-Damage Simulation of Contact Hole Etching

The present calculation example is simulation that assumed a two-dimensional contact hole etching of a $SiO_2$ film with the use of a CCP dry etching unit. A resist mask having a film thickness of 400 nm was used in two cases of having a hole diameter of 400 nm and 900 nm and the voxel model was used for the shape development (the size L of the voxel was 3 nm). The following etching process conditions were used. The unit conditions and the plasma conditions were similar to those of the above-described first calculation example.

(Etching Process Conditions)

type and flow rate of gas: $C_4F_8/O_2/Ar=33/8/400$ sccm pressure: 30 mTorr

Vpp=1450 V wafer temperature: 30 degrees Celsius

A calculation flow in the present calculation example was as shown in FIG. 26 described above. α was set as 0.1 and the step of time period of the surface reaction in the calculation was set as 0.01 s. At this time, using the above-described process conditions and gas flux data in a chamber that was obtained by plasma monitoring using OES, QMS, and IRLAS, a normal vector was derived, for example, by the above-described calculation process (i) in the first embodiment from the flux vectors of the ions ($CF^+$, $CF_3^+$, $CF_2^+$, $C_2F_4^+$, $F^+$, $Ar^+$) that entered voxels in the sidewalls and in the hole processing bottom portion and from the flux vectors of the radicals ($CF_2$, CF, F, $CF_3$, O). The surface reaction model established in consideration of the depth direction was solved using the normal vector and the flux amount in the normal vector direction, and thereby, the processing shape and the damage amount at the time when the etching time was 230 s was calculated. It is to be noted that although the above-described surface reaction model disclosed in Literature A was used as the surface reaction model established in consideration of the depth direction, the surface reaction model to be used is not limited thereto as long as the etching rate and the damage amount are allowed to be calculated.

Figure 31:
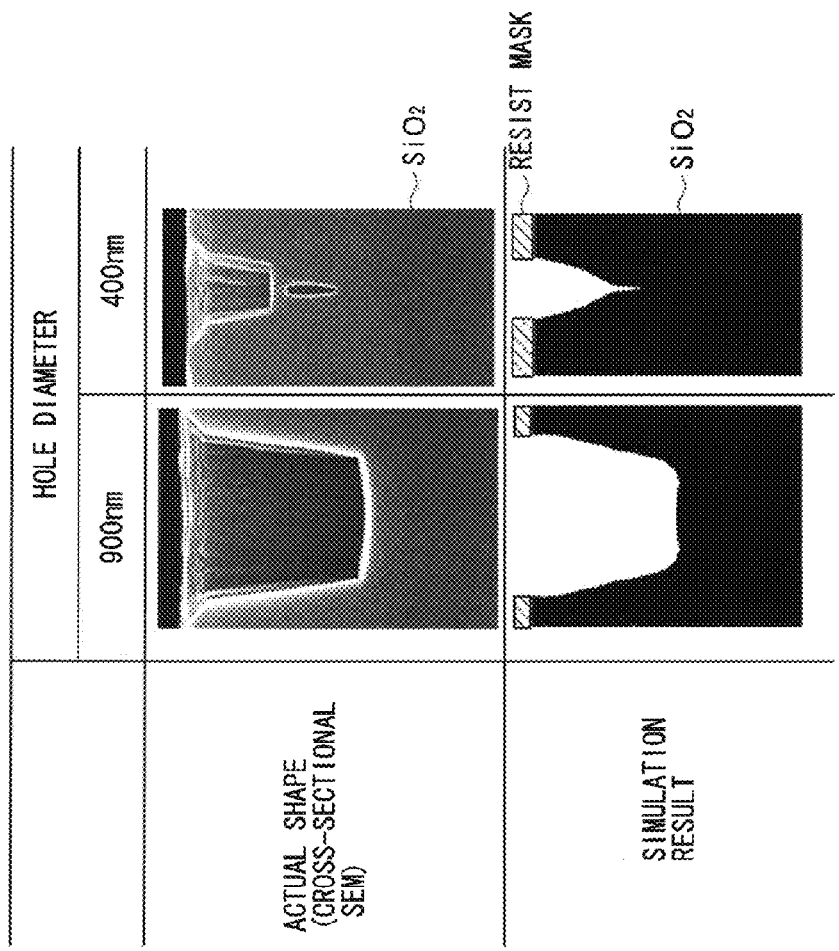
FIG. 31 is a cross-sectional view illustrating a second calculation example in which the simulation method according to the seventh embodiment was used.

As shown in FIG. 31, the simulated hole shape reproduced the actual shape (cross-sectional SEM) using similar process conditions. Damage allocation was performed by the above-described calculation process (ii) in the first embodiment. A discontinuous hole shape portion partially exists inside in the cross-sectional view of the actual shape of 400 nm shown in FIG. 31. However, a continuous hole shape was confirmed in other cross-section as in the simulation result.

It is to be noted that the process conditions, the gas fluxes, and the type of the film to be processed that are applicable to the simulation method according to the present embodiment are not limited to those described above. Moreover, those described above are similarly applicable to three-dimensional calculation. The shape development model may be other string model or may be a level-set model.

7-4. Configuration Example of Simulation Software

Program

The simulation method according to the present embodiment may be applicable, for example, to the above-described simulation software (FIG. 15) according to the third embodiment.

Specifically, the shape-damage calculation section 27 in FIG. 15 calculates the shape-damage distribution that takes into consideration the variation in the ion energy distribution function and the variation in the ion angular distribution function according to the calculation flow in FIG. 26. After terminating the calculation, results of the position information (processing shape information such as line width, taper, and a mask residual film) of voxels, damage distribution, film thickness of reaction sediments (polymers and oxides) are outputted from the output section 28 to a file. Further, these results may be visualized by the GUI 29. The data may be outputted or visualized during the calculation in real time.

7-5. First Configuration Example of Processing Unit

The simulation method according to the present embodiment may be applicable, for example, to the above-described processing unit (FIG. 16) according to the fourth embodiment.

Specifically, the module that performs the ion flux calculation shown in the calculation flow in FIG. 26 is included in the shape-damage calculation section 45 in FIG. 16, and the calculation of the shape-damage distribution that takes into consideration the variation in the IEDF and the variation in the IADF is performed. The shape-damage calculation section 45 takes into consideration the contribution to the flux of the wafer opening ratio and the semi-local opening ratio (that are in a linear relation) that are calculated by the opening ratio calculation section with the use of GDS and film-thickness information, and performs the calculation according to the calculation flow shown in FIG. 26. This process is sequentially repeated during the processing and the actual processing is allowed to be performed while confirming the prediction of the shape variation and the damage distribution in real time by the GUI visualization system.

7-6. Second Configuration Example of Processing Unit

The simulation method according to the present embodiment may be applicable, for example, to the above-described processing unit (FIG. 17) according to the fifth embodiment.

Specifically, the module that performs the ion flux calculation shown in the calculation flow in FIG. 26 is included in the optimization calculation system 52 in FIG. 17, and the calculation of the shape-damage distribution that takes into consideration the variation in the IEDF and the variation in the IADF is performed. The OES 33, the QMS 34, the IRLAS 35, and the energy spectrum analyzer 36 for acquiring the input data necessary for the simulation are mounted on the processing chamber 32, and plasma is continuously monitored by the foregoing components during the processing. The sampling rate may be, for example, 0.1 s. The information acquired by the foregoing components during the processing and the recipe information 31 are transferred to the simulation system 51, and the gas density, the IEDF, and the IADF are calculated. When the calculation time period is sufficiently shorter than the actual processing time period, all may be determined by the reactor simulation. Further, the optimization calculation section 52 takes into consideration the contribution to the flux of the wafer opening ratio and the semi-local opening ratio (in-chip opening ratio) (that are in a linear relation) that are calculated by the opening ratio calculation section 44 with the use of GDS and film-thickness information 41, and calculates the etching rate and the damage distribution according to the calculation flow shown in FIG. 26.

When the shape and the damage are out of the desirable spec (for example, when the variation value of line width may be ±10% or more of a desirable value of 70 nm and the damage amount may be increased by 50% of a desirable value of $10^{11}/cm^2$), process parameters may be varied in order of a gas flow rate, gas pressure, application power, and wafer temperature, for example, by ±50% (this determination condition value is parameterized), and the calculation in FIG. 26 may be performed. Thus, correction conditions that achieve the shape and the damage within the desirable spec are found. The correction conditions are transferred to the control system 38 thorough the correction process condition output section 55. The control system 38 transmits a control signal so that the processing chamber 32 satisfies the correction conditions. The processing chamber 32 changes the parameters relevant to the correction conditions and continues the processing. If a solution that satisfies the spec is not found in the simulation, an alert signal is transmitted to the FDC/EES system 39 and the unit is stopped thereby.

8. Other Embodiments

The technology according to the present disclosure is not limited to the above description of each embodiment and various modification may be made. Each of the above-described embodiments shows an example of a preferred example of the present technology and a technical range of the present technology is not limited to the above-described embodiments. For example, the present technology may be widely applicable to semiconductor processes and semiconductor manufacturing units that use plasma. The simulation method, the simulation program, and the processing unit according to the present technology may be widely applicable without depending on device type.

It is possible to achieve at least the following configurations from the above-described example embodiments and the modifications of the disclosure.

(1) A simulation method allowing an information processing unit to perform calculation, the calculation including:

decomposing each of a plurality of incident fluxes into flux components in respective unit vector directions that are orthogonal to each other, the plurality of incident fluxes entering, at an arbitrary position, a surface of a processing target that is a target of a predetermined processing;

summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

(2) The simulation method according to (1), the calculation further including:

generating voxel space and expressing a shape of the processing target with use of a plurality of voxels; and determining, based on the normal vector, damage to be caused on the processing target by the plurality of incident fluxes, and allocating the determined damage to the plurality of voxels.

(3) The simulation method according to (2), the calculation further including:

setting an initial voxel size of each of the voxels based on an initial condition; and optimizing the initial voxel size according to a reaction rate of the surface of the processing target, the reaction rate being calculated with use of the normal vector.

(4) The simulation method according to (2) or (3), the calculation further including:

calculating the normal vector for a first position and the normal vector for a second position on the surface of the processing target, and thereby determining a first normal vector at the first position and a second normal vector at the second position;

allocating first damage caused by the first normal vector to a voxel that is one of the plurality of voxels and exists only in a first region, the first region having a predetermined width and including the first normal vector; and allocating second damage caused by the second normal vector to a voxel that is one of the plurality of voxels and exists only in a second region, the second region having a predetermined width and including the second normal vector.

(5) The simulation method according to (4), the calculation further including, when the plurality of voxels include an overlapping voxel that exists in both the first region and the second region, allocating, to the overlapping voxel, damage obtained by adding the first damage and the second damage at a predetermined ratio.

(6) The simulation method according to (4), the calculation further including, when the plurality of voxels include an overlapping voxel that exists in both the first region and the second region, allocating, to the overlapping voxel, damage caused by one of the first and second normal vectors that is closer to the overlapping voxel.

(7) The simulation method according to (4), the calculation further including, when the plurality of voxels include an outside voxel that exists outside both the first region and the second region, allocating, to the outside voxel, damage obtained through interpolation calculation based on the first damage and the second damage.

(8) The simulation method according to (4), the calculation further including, when the plurality of voxels include an outside voxel that exists outside both the first region and the second region, allocating, to the outside voxel, damage caused by one of the first and second normal vectors that is closer to the outside voxel.

(9) The simulation method according to any one of (1) to (8), the calculation further including:

expressing a shape of the surface of the processing target with use of a string model that includes a plurality of lattice points, and simulating shape development based on the normal vector with use of the string model;

generating voxel space in vicinity of the surface of the processing target expressed with use of the string model, and arranging a plurality of voxels in the voxel space; and determining, based on the normal vector, damage caused on the processing target by the plurality of incident fluxes, and allocating the determined damage to the plurality of voxels.

(10) The simulation method according to any one of (1) to (9), the calculation further including, solving a surface reaction model based on both the normal vector and a total flux amount in the direction of the normal vector, the surface reaction model established in consideration of the direction of the normal vector, and thereby calculating either a reaction rate of the predetermined processing or damage to be caused on the processing target by the plurality of incident fluxes.

(11) The simulation method according to any one of (1) to (8), the calculation further including:

generating voxel space and expressing a shape of the processing target with use of a plurality of voxels;

solving, based on the normal vector, a predetermined surface reaction model, and thereby calculating a reaction rate of the predetermined processing in a predetermined step of time period;

integrating an amount of shape development based on the reaction rate for a plurality of steps of time period; and simulating the shape development on the plurality of voxels, based on the integrated amount of shape development.

(12) The simulation method according to (11), the calculation further including:

solving, based on the normal vector, the predetermined surface reaction model, and thereby calculating, in the predetermined step of time period, damage caused on the processing target;

integrating the determined damage for a plurality of steps of time period; and allocating the integrated damage to the plurality of voxels.

(13) The simulation method according to (11) or (12), wherein, the simulating of the shape development includes determining whether or not the integrated amount of the shape development satisfies a predetermined condition depending on a size of one of the voxels, and includes executing the shape development when the integrated amount of the shape development satisfies the predetermined condition.

(14) The simulation method according to any one of (11) to (13), wherein the processing target includes a plurality of processing layers made of different materials, and the expressing of the shape of the processing target by the plurality of voxels includes changing a size of the voxels that express the two or more of the processing layers when the shape development reaches a region in which the shape development is predicted to be performed over two or more of the processing layers.

(15) The simulation method according to any one of (11) to (14), wherein the processing target includes a plurality of processing layers made of different materials, the simulating of the shape development includes simulating the shape development based not on the integrated amount of the shape development but on an amount of the shape development corresponding to the predetermined step of time period, in a region in which the shape development is predicted to be performed in a single processing layer of the plurality of processing layers, and simulating the shape development based on the integrated amount of the shape development in a region in which the shape development is predicted to be performed over two or more of the processing layers.

(16) The simulation method according to any one of (1) to (10), the calculation further including:

calculating variation in ion energy distribution function and variation in ion angular distribution function at time when an ion passes through a deposition film formed on the surface of the processing target and a reaction layer of the processing target formed below the deposition film; and calculating the plurality of incident fluxes in consideration of the variation in the ion energy distribution function and the variation in the ion angular distribution function.

(17) The simulation method according to (16), the calculation further including:

solving, based on the normal vector, a predetermined surface reaction model, and thereby calculating a reaction rate of the predetermined processing;

calculating, based on the reaction rate, shape development of the processing target;

calculating variation in thickness of the deposition film caused by the shape development; and recalculating the variation in the ion energy distribution function and the variation in the ion angular distribution function with use of a value of the variation in the thickness of the deposition film as a parameter.

(18) The simulation method according to (16) or (17), wherein, the calculating the variation in the ion angular distribution function includes calculating the variation in the ion angular distribution function to allow a total amount of incident ion fluxes in a first angle range of the ion angular distribution function immediately before the ion enters the deposition film to be equal to a total amount of incident ion fluxes in a second angle range of the ion angular distribution function at time when the ion passes through the reaction layer.

(19) The simulation method according to any one of (16) to (18), wherein the variation in the ion energy distribution function is calculated in consideration of a decrease in ion energy at time when the ion passes through the deposition film and the reaction layer.

(20) The simulation method according to any one of (1) to (19), wherein the predetermined processing is a process provided for semiconductor processing, and the plurality of incident fluxes are calculated in consideration of one or more of contributions of a wafer opening ratio, an in-chip opening ratio, and a local pattern structure.

(21) The simulation method according to any one of (1) to (20), wherein the calculating of the plurality of incident fluxes includes calculating the normal vector in consideration of one or both of a component directly entering the surface of the processing target at the arbitrary position and a component indirectly entering the surface of the processing target at the arbitrary position.

(22) The simulation method according to any one of (1) to (21), wherein the predetermined processing is processing of a semiconductor with use of plasma, and one or both of plasma gas-phase calculation and sheath calculation are reflected to the calculating of the normal vector.

(23) A non-transitory computer-readable medium storing a simulation program that allows an information processing unit to perform calculation, the calculation including:

decomposing each of a plurality of incident fluxes into flux components in respective unit vector directions that are orthogonal to each other, the plurality of incident fluxes entering, at an arbitrary position, a surface of a processing target that is a target of a predetermined processing;

summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

(24) A processing unit including:
a processing section performing a predetermined processing on a processing target; and
a simulator simulating the predetermined processing, the simulator performing calculation including
decomposing each of a plurality of incident fluxes into flux components in respective unit vector directions that are orthogonal to each other, the plurality of incident fluxes entering, at an arbitrary position, a surface of the processing target,
summing up the flux components for each of the plurality of unit vector directions, and
synthesizing a plurality of flux components into one vector, the plurality of flux components being summations in the respective unit vector directions and being orthogonal to each other, and thereby calculating a normal vector at the arbitrary position on the surface of the processing target.

(25) The processing unit according to (24), wherein
the simulator includes an input section acquiring a processing condition for performing the predetermined processing, and
the processing condition acquired by the input section includes information that is obtained by monitoring the processing performed by the processing section.

(26) The processing unit according to (24), wherein the simulator includes an output section outputting a simulation result of the predetermined processing.

(27) The processing unit according to (26), further including a control section correcting the processing condition for performing the predetermined processing by the processing section based on the simulation result.

(28) A simulator including a calculation section simulating a predetermined processing on a processing target, the calculation section performing calculation including
decomposing each of a plurality of incident fluxes into flux components in respective unit vector directions that are orthogonal to each other, the plurality of incident fluxes entering, at an arbitrary position, a surface of the processing target;
summing up the flux components for each of the plurality of unit vector directions; and
synthesizing a plurality of flux components into one vector, the plurality of flux components being summations in the respective unit vector directions and being orthogonal to each other, and thereby calculating a normal vector at the arbitrary position on the surface of the processing target.

The present application contains subject matter related to that disclosed in Japanese Priority Patent Application JP 2012-146065 filed in the Japan Patent Office on Jun. 28, 2012 and Japanese Priority Patent Application JP 2013-014556 filed in the Japan Patent Office on Jan. 29, 2013 the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A simulation method allowing an information processing unit to perform calculation, the calculation comprising:
decomposing each of a plurality of incident fluxes into flux components in respective unit vector directions that are orthogonal to each other, the plurality of incident fluxes entering, at an arbitrary position, a surface of a processing target that is a target of a predetermined processing;
summing up the flux components for each of the plurality of unit vector directions; and
synthesizing a plurality of flux components into one vector, the plurality of flux components being summations in the respective unit vector directions and being orthogonal to each other, and thereby calculating a normal vector at the arbitrary position on the surface of the processing target.

2. The simulation method according to claim 1, the calculation further comprising:
generating voxel space and expressing a shape of the processing target with use of a plurality of voxels; and
determining, based on the normal vector, damage to be caused on the processing target by the plurality of incident fluxes, and allocating the determined damage to the plurality of voxels.

3. The simulation method according to claim 2, the calculation further comprising:
setting an initial voxel size of each of the voxels based on an initial condition; and
optimizing the initial voxel size according to a reaction rate of the surface of the processing target, the reaction rate being calculated with use of the normal vector.

4. The simulation method according to claim 2, the calculation further comprising:
calculating the normal vector for a first position and the normal vector for a second position on the surface of the processing target, and thereby determining a first normal vector at the first position and a second normal vector at the second position;
allocating first damage caused by the first normal vector to a voxel that is one of the plurality of voxels and exists only in a first region, the first region having a predetermined width and including the first normal vector; and
allocating second damage caused by the second normal vector to a voxel that is one of the plurality of voxels and exists only in a second region, the second region having a predetermined width and including the second normal vector.

5. The simulation method according to claim 4, the calculation further comprising, when the plurality of voxels include an overlapping voxel that exists in both the first region and the second region,
allocating, to the overlapping voxel, damage obtained by adding the first damage and the second damage at a predetermined ratio.

6. The simulation method according to claim 4, the calculation further comprising, when the plurality of voxels include an overlapping voxel that exists in both the first region and the second region,
allocating, to the overlapping voxel, damage caused by one of the first and second normal vectors that is closer to the overlapping voxel.

7. The simulation method according to claim 4, the calculation further comprising, when the plurality of voxels include an outside voxel that exists outside both the first region and the second region,
allocating, to the outside voxel, damage obtained through interpolation calculation based on the first damage and the second damage.

8. The simulation method according to claim 4, the calculation further comprising, when the plurality of voxels include an outside voxel that exists outside both the first region and the second region,
allocating, to the outside voxel, damage caused by one of the first and second normal vectors that is closer to the outside voxel.

9. The simulation method according to claim 1, the calculation further comprising:

expressing a shape of the surface of the processing target with use of a string model that includes a plurality of lattice points, and simulating shape development based on the normal vector with use of the string model;

generating voxel space in vicinity of the surface of the processing target expressed with use of the string model, and arranging a plurality of voxels in the voxel space; and determining, based on the normal vector, damage caused on the processing target by the plurality of incident fluxes, and allocating the determined damage to the plurality of voxels.

10. The simulation method according to claim 1, the calculation further comprising, solving a surface reaction model based on both the normal vector and a total flux amount in the direction of the normal vector, the surface reaction model established in consideration of the direction of the normal vector, and thereby calculating either a reaction rate of the predetermined processing or damage to be caused on the processing target by the plurality of incident fluxes.

11. The simulation method according to claim 1, the calculation further comprising:

generating voxel space and expressing a shape of the processing target with use of a plurality of voxels;

solving, based on the normal vector, a predetermined surface reaction model, and thereby calculating a reaction rate of the predetermined processing in a predetermined step of time period;

integrating an amount of shape development based on the reaction rate for a plurality of steps of time period; and simulating the shape development on the plurality of voxels, based on the integrated amount of shape development.

12. The simulation method according to claim 11, the calculation further comprising:

solving, based on the normal vector, the predetermined surface reaction model, and thereby calculating, in the predetermined step of time period, damage caused on the processing target;

integrating the determined damage for a plurality of steps of time period; and allocating the integrated damage to the plurality of voxels.

13. The simulation method according to claim 11, wherein, the simulating of the shape development includes determining whether or not the integrated amount of the shape development satisfies a predetermined condition depending on a size of one of the voxels, and includes executing the shape development when the integrated amount of the shape development satisfies the predetermined condition.

14. The simulation method according to claim 11, wherein the processing target includes a plurality of processing layers made of different materials, and the expressing of the shape of the processing target by the plurality of voxels includes changing a size of the voxels that express the two or more of the processing layers when the shape development reaches a region in which the shape development is predicted to be performed over two or more of the processing layers.

15. The simulation method according to claim 11, wherein the processing target includes a plurality of processing layers made of different materials, the simulating of the shape development includes simulating the shape development based not on the integrated amount of the shape development but on an amount of the shape development corresponding to the predetermined step of time period, in a region in which the shape development is predicted to be performed in a single processing layer of the plurality of processing layers, and simulating the shape development based on the integrated amount of the shape development in a region in which the shape development is predicted to be performed over two or more of the processing layers.

16. The simulation method according to claim 1, the calculation further comprising:

calculating variation in ion energy distribution function and variation in ion angular distribution function at time when an ion passes through a deposition film formed on the surface of the processing target and a reaction layer of the processing target formed below the deposition film; and calculating the plurality of incident fluxes in consideration of the variation in the ion energy distribution function and the variation in the ion angular distribution function.

17. The simulation method according to claim 16, the calculation further comprising:

solving, based on the normal vector, a predetermined surface reaction model, and thereby calculating a reaction rate of the predetermined processing;

calculating, based on the reaction rate, shape development of the processing target;

calculating variation in thickness of the deposition film caused by the shape development; and recalculating the variation in the ion energy distribution function and the variation in the ion angular distribution function with use of a value of the variation in the thickness of the deposition film as a parameter.

18. A non-transitory computer-readable medium storing a simulation program that allows an information processing unit to perform calculation, the calculation comprising:

decomposing each of a plurality of incident fluxes into flux components in respective unit vector directions that are orthogonal to each other, the plurality of incident fluxes entering, at an arbitrary position, a surface of a processing target that is a target of a predetermined processing;

summing up the flux components for each of the plurality of unit vector directions; and synthesizing a plurality of flux components into one vector, the plurality of flux components being summations in the respective unit vector directions and being orthogonal to each other, and thereby calculating a normal vector at the arbitrary position on the surface of the processing target.

19. A processing unit comprising:

a processing section performing a predetermined processing on a processing target; and a simulator simulating the predetermined processing, the simulator performing calculation including decomposing each of a plurality of incident fluxes into flux components in respective unit vector directions that are orthogonal to each other, the plurality of incident fluxes entering, at an arbitrary position, a surface of the processing target, summing up the flux components for each of the plurality of unit vector directions, and synthesizing a plurality of flux components into one vector, the plurality of flux components being summations in the respective unit vector directions and being orthogonal to each other, and thereby calculating a normal vector at the arbitrary position on the surface of the processing target.

20. A simulator comprising a calculation section simulating a predetermined processing on a processing target, the calculation section performing calculation including decomposing each of a plurality of incident fluxes into flux components in respective unit vector directions that are orthogonal to each other, the plurality of incident fluxes entering, at an arbitrary position, a surface of the processing target, summing up the flux components for each of the plurality of unit vector directions, and synthesizing a plurality of flux components into one vector, the plurality of flux components being summations in the respective unit vector directions and being orthogonal to each other, and thereby calculating a normal vector at the arbitrary position on the surface of the processing target.

* * * * *